United States Patent
Loga et al.

(12) 
(10) Patent No.: US 10,697,558 B2
(45) Date of Patent: Jun. 30, 2020

(54) FLOW CONTROL SYSTEM AND CONTROL VALVE HAVING CLOSURE ASSISTANCE

(71) Applicant: Daniel Measurement and Control, Inc., Houston, TX (US)

(72) Inventors: Thomas Henry Loga, Sugar Land, TX (US); David J. Seiler, Spring, TX (US); Justin Blake Crouch, Cypress, TX (US); Michael Richard Adib Zahr, College Station, TX (US); Raul H. Almazan, The Woodlands, TX (US)

(73) Assignee: Daniel Measurement and Control, Inc., Houston, TX (US)

(*) Notice: Subject to any disclaimer, the term of this patent is extended or adjusted under 35 U.S.C. 154(b) by 0 days.

(21) Appl. No.: 14/450,448

(22) Filed: Aug. 4, 2014

(65) Prior Publication Data

US 2015/0034179 A1    Feb. 5, 2015

Related U.S. Application Data

(60) Provisional application No. 61/861,771, filed on Aug. 2, 2013, provisional application No. 62/000,079, filed on May 19, 2014.

(51) Int. Cl.
| | | |
|---|---|---|
| *F16K 31/124* | (2006.01) | |
| *F16K 3/24* | (2006.01) | |
| *F16K 17/06* | (2006.01) | |

(52) U.S. Cl.
CPC .......... *F16K 31/1245* (2013.01); *F16K 3/246* (2013.01); *F16K 17/065* (2013.01);
(Continued)

(58) Field of Classification Search
CPC .......... F16K 1/54; F16K 47/02; F16K 31/383; F02M 63/0054; F02M 59/462
(Continued)

(56) References Cited

U.S. PATENT DOCUMENTS

| | | | | |
|---|---|---|---|---|
| 2,959,390 A | * | 11/1960 | Wyss | F16K 31/383 |
| | | | | 137/219 |
| 3,101,924 A | * | 8/1963 | Berck | F16K 21/18 |
| | | | | 137/596.2 |

(Continued)

FOREIGN PATENT DOCUMENTS

| | | |
|---|---|---|
| CN | 2159479 Y | 3/1994 |
| CN | 200996475 Y | 12/2007 |

(Continued)

OTHER PUBLICATIONS

Technical Guide entitled "Daniel Liquid Control Valves Technical Guide," DAN-LIQ-TG-44-rev0208, Feb. 2008 (49 p.).
(Continued)

*Primary Examiner* — Angelisa L. Hicks
(74) *Attorney, Agent, or Firm* — Conley Rose, P.C.

(57) ABSTRACT

A control valve includes a piston-housing having a hollow portion. The hollow portion has a first end, an open end, first and second internal chambers, and a fluid port configured to allow fluid to exit the second chamber. The first chamber is nearer the first end, and the second chamber is nearer the open end. A piston is located within the housing and is adapted for reciprocal motion. The piston includes a first and second seal-engaging portions. The first seal-engaging portion has a diameter that is less than the diameter of the second seal-engaging portion.

17 Claims, 13 Drawing Sheets

(52) U.S. Cl.
CPC .... *Y10T 137/7769* (2015.04); *Y10T 137/7904* (2015.04); *Y10T 137/7922* (2015.04)

(58) Field of Classification Search
USPC ............................ 251/251, 321; 137/601.18
See application file for complete search history.

(56) References Cited

U.S. PATENT DOCUMENTS

| | | | | |
|---|---|---|---|---|
| 3,260,275 | A * | 7/1966 | Armstrong | G05D 16/106 |
| | | | | 137/219 |
| 3,977,423 | A * | 8/1976 | Clayton | G05D 16/166 |
| | | | | 137/12 |
| 4,070,000 | A * | 1/1978 | Prescott | F16K 31/383 |
| | | | | 251/26 |
| 4,397,331 | A * | 8/1983 | Medlar | F16K 47/02 |
| | | | | 137/375 |
| 4,418,839 | A * | 12/1983 | Nichols | B67D 7/301 |
| | | | | 137/486 |
| 4,694,730 | A * | 9/1987 | Krieger | E21D 23/26 |
| | | | | 251/63 |
| 4,718,450 | A * | 1/1988 | Ezekoye | F16K 17/0433 |
| | | | | 137/469 |
| 5,868,160 | A * | 2/1999 | Cords | F15B 13/0405 |
| | | | | 137/454.6 |
| 5,950,657 | A * | 9/1999 | Lai | G05D 16/166 |
| | | | | 137/102 |
| 6,152,423 | A * | 11/2000 | Nichols | F16J 15/166 |
| | | | | 251/360 |
| 6,899,316 | B2 | 5/2005 | Duelli | |
| 2001/0005005 | A1 * | 6/2001 | Bonomi | F16K 1/10 |
| | | | | 251/63 |
| 2002/0174652 | A1 | 11/2002 | Nakano | |
| 2006/0157116 | A1 | 7/2006 | Martin | |
| 2006/0260693 | A1 * | 11/2006 | Chalk | F04B 53/1022 |
| | | | | 137/514 |
| 2007/0272307 | A1 | 11/2007 | Patterson et al. | |
| 2011/0123376 | A1 | 5/2011 | Aritomi et al. | |
| 2011/0278488 | A1 * | 11/2011 | Feser | F16K 27/02 |
| | | | | 251/324 |
| 2015/0034179 | A1 | 2/2015 | Loga et al. | |

FOREIGN PATENT DOCUMENTS

| | | |
|---|---|---|
| CN | 101454737 A | 6/2009 |
| CN | 201526725 U | 7/2010 |
| CN | 202302234 U | 7/2012 |
| CN | 204226806 U | 3/2015 |
| DE | 4416955 A1 | 12/1994 |
| EP | 1076787 B1 | 6/2003 |
| EP | 1853840 B1 | 2/2011 |
| EP | 2511579 A1 | 10/2012 |
| JP | 1982-085664 U | 5/1982 |
| KR | 2004-0090915 A | 10/2004 |
| KR | 1023799 B1 | 3/2011 |
| KR | 2013-0003898 A | 1/2013 |
| KR | 10-1290283 B1 | 7/2013 |
| WO | 99/57467 A1 | 11/1999 |

OTHER PUBLICATIONS

PCT/US2014/049545 International Search Report and Written Opinion dated Feb. 23, 2015 (15 p.).
Chinese Office Action dated May 31, 2016, for Chinese Application No. 201410380220.1 (11 p.).
English Translation of Chinese Office Action dated May 31, 2016, for Chinese Application No. 201410380220.1 (11 p.).
Extended European Search Report dated May 26, 2017, for European patent application No. 14832672.1.
Office Action dated Nov. 30, 2017, and English summary, for Korean Application No. 10-2016-7005455.
Examination Report dated Mar. 25, 2019, for Indian Patent Application No. 201617003677.

* cited by examiner

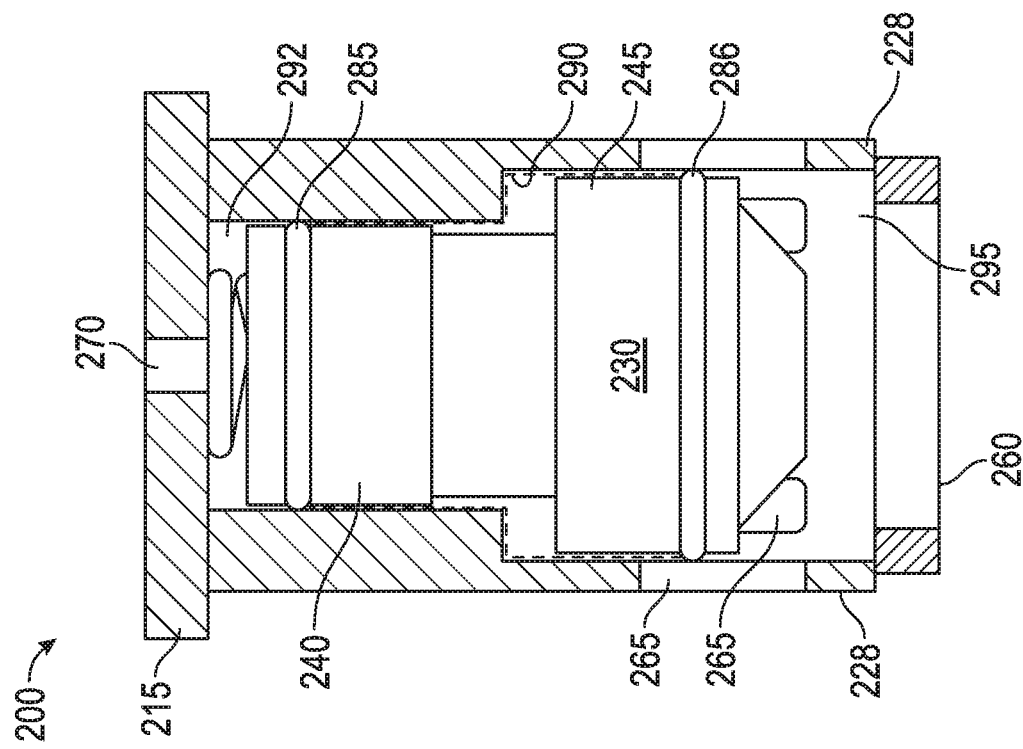
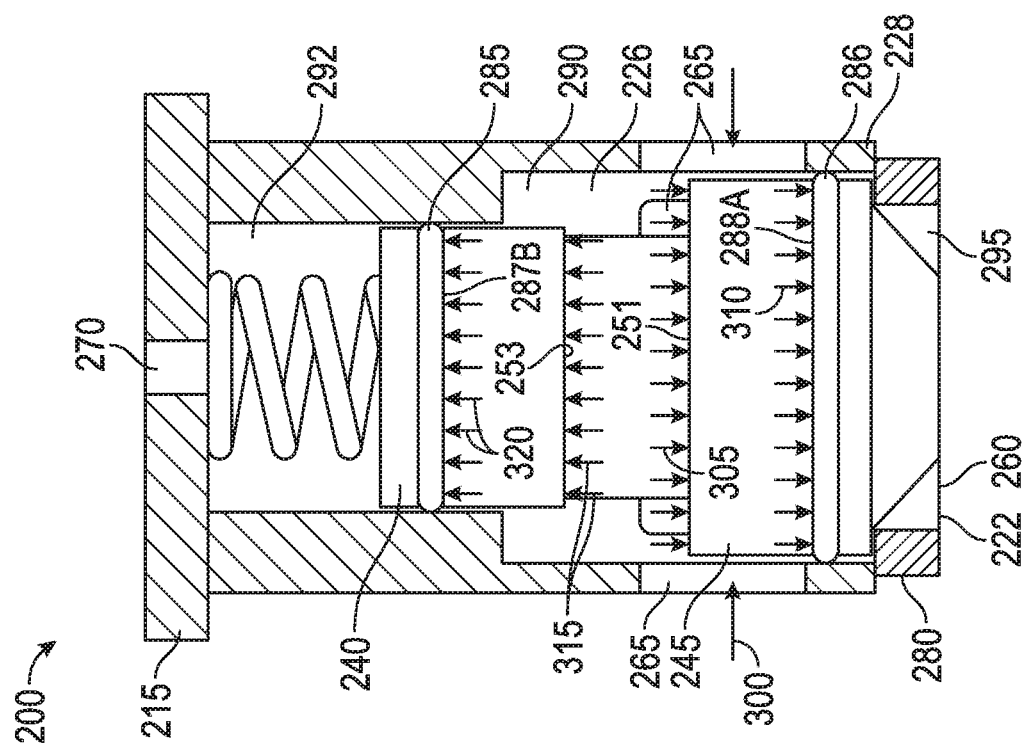

FLOW CONTROL SYSTEM AND CONTROL VALVE HAVING CLOSURE ASSISTANCE

CROSS-REFERENCE TO RELATED APPLICATIONS

This application claims priority to U.S. Provisional Patent Application No. 61/861,771 filed on Aug. 2, 2013, and titled "A Flow Control System and Control Valve Having Closure Assistance." This application also claims priority to U.S. Provisional Patent Application No. 62/000,079 filed on May 19, 2014, and also titled "A Flow Control System and Control Valve Having Closure Assistance." These two provisional patent applications are incorporated herein by reference in their entirety.

STATEMENT REGARDING FEDERALLY SPONSORED RESEARCH OR DEVELOPMENT

Not applicable.

BACKGROUND

1. Field of the Disclosure

This disclosure relates generally to controlling the flow of a fluid. More particularly, it relates to an apparatus and system for controlling the flow of a high pressure fluid. Still more particularly, this disclosure relates to a control valve and that allows a high pressure fluid to flow only in one direction.

2. Background Information

Control valves are used within industrial processes to govern the flow of fluid between a source and a destination (e.g. pipe, tubing, or vessel). Certain control valves are designed so that particular process conditions cause the valve to close, prohibiting fluid flow from the source and a destination, while other process conditions cause the valve to open. A common control valve includes a body, a piston, a seal between the body and piston, and biasing spring to engage the body, piston, and seal, i.e. to exert a closing-force on the piston. These control valves are actuated by the spring and by the varying fluid pressures in the source and destination. Limitations in machining tolerances of the various surfaces of the valve can adversely influence its performance. In some circumstances, a valve having loose machining tolerances opens when it should be closed, causing undesired backflow into the source line. Such an undesirable backflow condition may occur to a valve having poor machining tolerances when, for example, the destination line pressure fluctuates and becomes greater than the source line pressure and exerts a force on the valve piston that is greater than the spring's closing-force. A method or valve design that is more robust, less susceptible to machining tolerances, variations, and pressure fluctuations, would be advantageous in industrial applications.

BRIEF SUMMARY OF THE DISCLOSURE

Disclosed herein is a control valve including a piston housing and a piston adapted for reciprocal motion therein. The housing includes a hollow portion with a first end, a second and open end, first and second internal chambers, and a fluid port into the second chamber. The first chamber is proximal to the first end, and the second chamber is proximal the open end. The piston includes first and second seal-engaging portions, the first seal-engaging portion having a diameter that is less than the diameter of the second seal-engaging portion.

In an embodiment, the control valve also includes a first annular seal sealingly engaging the first seal-engaging portion and configured to prevent a fluid flow between at least a portion of the first chamber and at least a portion of the second chamber; a second annular seal axially spaced from the first annular seal and configured to engage sealingly the second chamber and the second seal-engaging portion of the piston; and a fluid zone positioned between the first and second annular seals and in fluid communication with the second chamber and the fluid port.

In an embodiment, the piston includes a first set of surface regions facing generally toward the piston housing first end and having a total axially-projected surface area; a second set of surface regions facing generally toward the open end of the piston housing and having a total axially-projected surface area; wherein the total axially-projected surface area of the first set of surface regions exceeds the total axially-projected surface area of the second set of surface regions. The piston may reciprocate between a closed configuration in which fluid communication is prevented between the open end of the piston housing and the second chamber, and an open configuration in which fluid communication is allowed between the open end and the second chamber. The valve may be configured such that when the valve is in the closed configuration, the first and second set of surface regions are disposed within the second chamber.

Also disclosed is a flow control system having a flow control valve that includes a piston housing and a piston adapted for reciprocal motion therein. The housing includes a head portion and a hollow extension, the extension having an open end, first and second internal chambers, and a fluid port configured to allow fluid to exit the second chamber. The first chamber is adjacent to the head portion and has a diameter less than the diameter of the second chamber. The second chamber is adjacent to the open end. The piston includes first and second seal-engaging portions, the first seal-engaging portion having a diameter that is less than the diameter of the second seal-engaging portion.

In an embodiment, the system includes: a control valve having a control port adjacent the head portion of the housing; a supply pipe; a discharge pipe; a first system port in fluid communication with the supply pipe; a second system port in fluid communication with the discharge pipe; a throttle valve having an inlet in fluid communication with the first system port and having an exit in fluid communication with the control port of the control valve. The system includes a pilot valve having a first pilot port in fluid communication with the control port of the control valve and the throttle valve exit, and having a second pilot port in fluid communication with the second system port. The control valve is disposed between the supply pipe and the discharge pipe. One or both of the throttle and pilot valve may be adjustable.

In an embodiment, the flow control system includes a control valve having: a biasing member disposed between the piston and the housing to bias the piston away from the head portion of the housing; a first annular seal disposed within the first chamber and configured to engage sealingly the first chamber and the first seal-engaging portion of the piston; a second annular seal axially spaced from the first annular seal and disposed within the second chamber, the second annular seal being configured to engage sealingly the second chamber and the second seal-engaging portion of the piston; and a fluid zone that extends between the first and second annular seals and is in fluid communication with the fluid port.

The piston may further include: a first set of surface regions facing generally toward the head portion and having a total axially-projected surface area; a second set of surface regions facing generally toward the open end of the piston housing and having a total axially-projected surface area; wherein the total axially-projected surface area of the first set of surface regions exceeds the total axially-projected surface area of the second set of surface regions. In an embodiment, the total axially-projected surface area of the first set of surface regions is not greater than 105% of the total axially-projected surface area of the second set of surface regions.

Also disclosed is a control valve comprising a piston housing and a piston disposed for reciprocal motion within the housing. The housing includes a hollow portion, a sidewall having an open end, a plurality of fluid ports extending through the sidewall, and a plurality of doors, each door configured to seal selectively one of the fluid ports.

BRIEF DESCRIPTION OF THE DRAWINGS

For a detailed description of the disclosed embodiments, reference will now be made to the accompanying drawings in which:

FIG. 7 is a side view, in partial cross-section, of the control valve of FIG. 2 again in a closed configuration and also showing a representation of various axial force distributions related to a possible flow condition in accordance with principles described herein;

FIG. 8 is a side view, in partial cross-section, of the control valve of FIG. 2 in an open configuration in accordance with principles described herein;

NOTATION AND NOMENCLATURE

Figure 1:
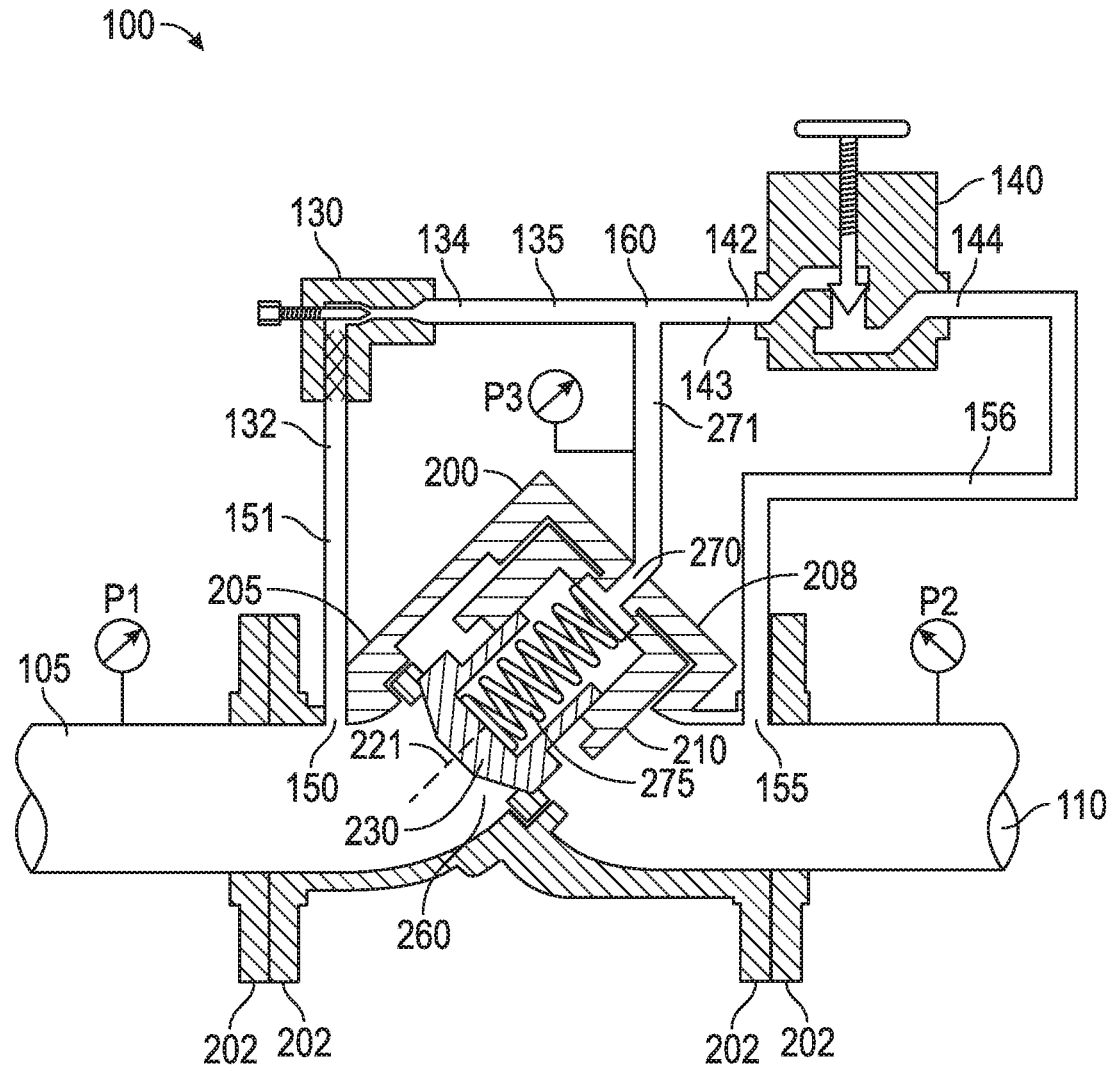
FIG. 1 is a schematic, partially cross-sectional view of a flow control system in accordance with principles described herein.

The drawing figures are not necessarily to scale. Certain features and components disclosed herein may be shown exaggerated in scale or in somewhat schematic form, and some details of conventional elements may not be shown in the interest of clarity and conciseness. In some of the figures, in order to improve clarity and conciseness, one or more components or aspects of a component may be omitted or may not have reference numerals identifying the features or components that are identified elsewhere. In addition, among the drawings, like or identical reference numerals may be used to identify common or similar elements.

The terms "including" and "comprising" are used herein, including in the claims, in an open-ended fashion, and thus should be interpreted to mean "including, but not limited to . . . ." Also, the term "couple" or "couples" is intended to mean either an indirect or direct connection. Thus, if a first component couples or is coupled to a second component, the connection between the components may be through a direct engagement of the two components, or through an indirect connection that is accomplished via other intermediate components, devices and/or connections. The recitation "based on" means "based at least in part on." Therefore, if X is based on Y, X may be based on Y and any number of other factors.

In addition, as used herein including the claims, the terms "axial" and "axially" generally mean along or parallel to a given axis (e.g., central axis of a body or a port), while the terms "radial" and "radially" generally mean perpendicular to the axis. For instance, an axial distance refers to a distance measured along or parallel to a given axis, and a radial distance means a distance measured perpendicular to the axis.

DETAILED DESCRIPTION OF THE DISCLOSED EMBODIMENTS

FIG. 1 shows, in schematic form, an exemplary embodiment of a flow control system 100 for governing the flow of a fluid from a supply pipe 105 to a discharge pipe 110 by a surface area-compensated control valve 200 coupled between pipes 105, 110. Flow control system 100 also includes a throttle valve 130, a pilot valve 140, an upstream fluid port or system port 150 in fluid communication with the supply pipe 105, a downstream fluid port 155 in fluid communication with the discharge pipe 110.

Figure 2:
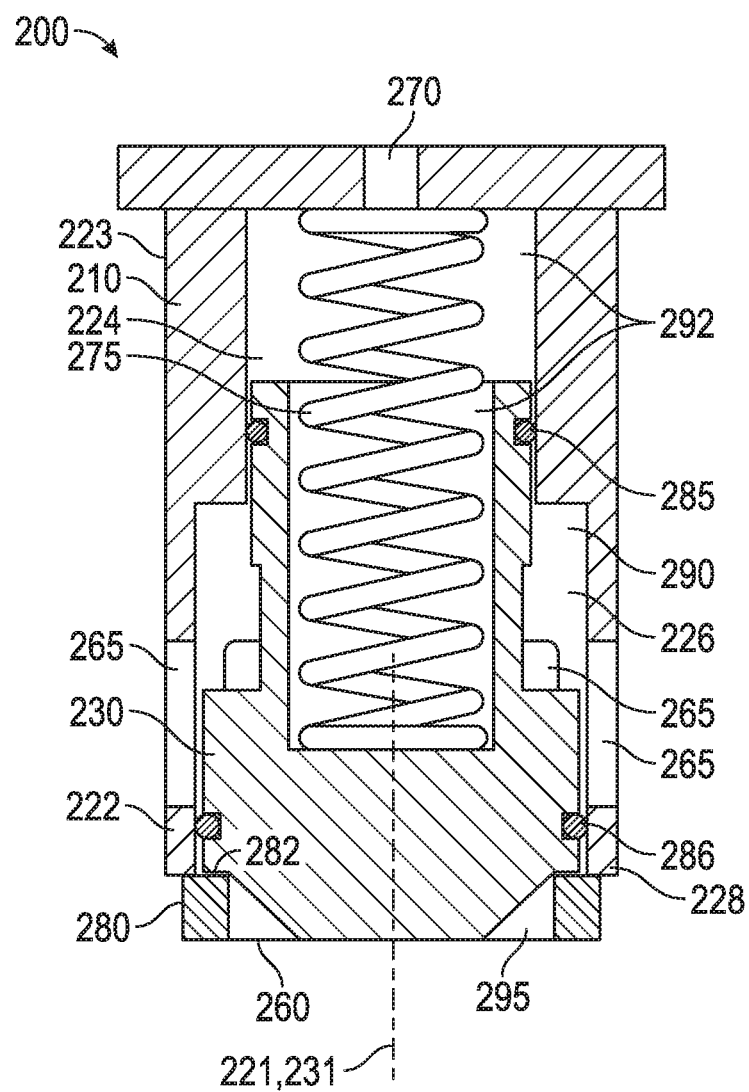
FIG. 2 is a side view, in partial cross-section, of the control valve of the flow control system of FIG. 1, shown in a closed configuration, in accordance with principles described herein.

Referring now to both FIG. 1 and FIG. 2, control valve 200 includes a valve body 205, a removable end 208, a piston housing 210 positioned within valve body 205, a surface area-compensated piston 230 positioned within piston housing 210, a control valve inlet 260 in fluid communication with port 150 and with supply pipe 105. Removable end 208 is coupled to valve body 205, the coupling being achieved by fasteners (not shown) or by threads cut into end 208 and body 205, for example. In this manner, removable end 208 is configured as a head portion for valve 200. Piston housing 210 includes a plurality of radially-extending fluid ports 265 in fluid communication with port 155 and with discharge pipe 110. Piston 230 is positioned between control valve inlet 260 and fluid ports 265 and is adapted for reciprocal motion along a central axis 221 within housing 210 to allow and, alternately, to prevent fluid communication between inlet 260 and fluid ports 265, and ultimately to discharge pipe 110. Control valve 200 further includes a control port 270 extending through or proximal to removable end 208 to influence the behavior of piston 230 in response to differences between supply pressure P1 in pipe 105 and discharge pressure P2 in pipe 110. In the embodiment of FIG. 1 and FIG. 2, piston housing 210 is generally cylindrical and is configured as a member that can be inserted into and removed from valve body 205 as facilitated by removable end 208.

Returning to FIG. 1, throttle valve 130 includes an inlet 132 coupled for fluid communication with the fluid port 150 by a supply pressure line 151 and includes an exit 134 coupled for fluid communication with throttle valve exit line 135. In this context, "line" refers to tubing, pipe, hose, or a similar device configured for fluid communication. In this embodiment, throttle valve 130 is shown as an adjustable needle valve with a strainer at inlet 132. Similarly, pilot valve 140 includes a first pilot port 142, which is coupled for fluid communication by pilot line 143, and a second pilot port 144, which is coupled for fluid communication with fluid port 155 by a discharge pressure line 156. A manifold 160 couples three flow pathways for fluid communication, those flow pathways being: throttle valve exit line 135 communicating with throttle valve exit 134, pilot line 143 communicating with first pilot port 142, and a control line 271 communicating with control port 270 of the control valve 200. The fluid pressure in the vicinity of manifold 160 and control port 270 is designated as pressure P3. Throttle valve 130 is arranged and configured to control or to influence, the exchange of fluid and fluid pressure between port 150 and control port 270, through manifold 160. Similarly, pilot valve 140 is arranged and configured to pilot, i.e. to control or to influence, the exchange of fluid and fluid pressure between downstream fluid port 155 and control port 270, through manifold 160. Throttle valve 130 and pilot valve 140 mutually communication through manifold 160.

Although throttle valve 130 is schematically represented in FIG. 1 as a manually adjustable valve, in various other embodiments the throttle valve 130 has any controllable actuator, such as an electrically or mechanically controllable actuator, or it may have a fixed orifice and thus be nonadjustable. So too, although schematically represented as manually adjustable valve, in various other embodiments, the pilot valve 140 has any electrically or mechanically controllable actuator or another suitable means of actuation in place of the manual actuation represented in FIG. 1.

Figure 3:
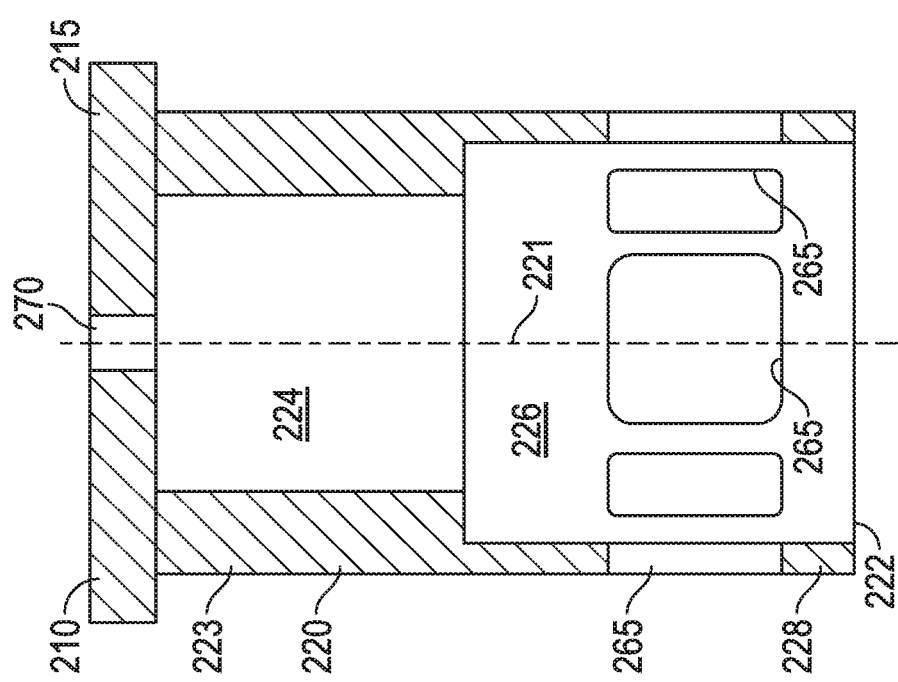
FIG. 3 is a side view, in cross-section, of the piston housing in FIG. 2 in accordance with principles described herein.

Referring now to FIG. 3, piston housing 210 includes a head portion 215 and a hollow extension 220 having a first end 223 proximal head portion 215, a second, open end 222 opposite the first end, a first, upper cylindrical chamber 224 proximal the first end 223, and a second, lower cylindrical chamber 226 that is concentric and intersects upper chamber 224 along central axis 221. The lower chamber 226 is proximal the open end 222. Hollow extension 220 is shown as being generally-cylindrical in this embodiment. The upper chamber 224 is adjacent to the head portion 215 and has a diameter less than the diameter of the lower chamber 226. The lower chamber 226 is adjacent to the open end 222. In combination, chambers 224, 226 extend from the head portion 215 to the open end 222. The plurality of fluid ports 265 extend radially through the sidewall of extension 220, perforating a portion of the extension 220 and intersecting the lower chamber 226. Fluid ports 265 are configured to allow fluid to exit and to enter the lower chamber. Although, eight fluid ports 265 are indicated by the sectional view of FIG. 3, in practice, any suitable number of fluid ports 265 may be formed in the sidewall of extension 220, including one, two, 15, or more fluid ports 265, for example. Between open end 222 and fluid ports 265, extension 220 includes an annular, non-perforated seal region 228. Distal the open end 222, control port 270 provides a path for fluid communication with a portion of the upper chamber 224, allowing fluid to enter and exit the upper chamber 224. In this embodiment, control port 270 is aligned with axis 221 and extends through head portion 215.

Figure 4:
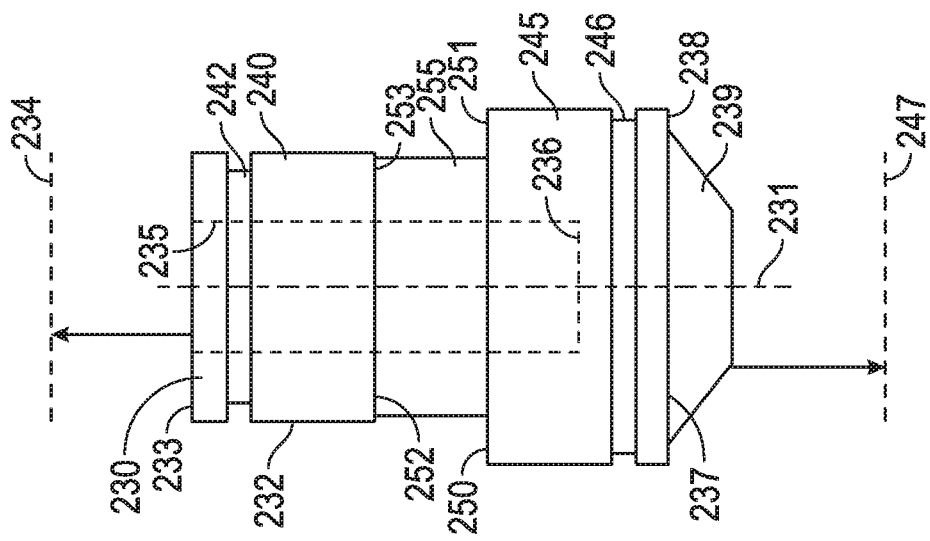
FIG. 4 is a side view of the piston in FIG. 2 in accordance with principles described herein.

Best seen in FIG. 4, piston 230 includes a generally cylindrical body 232 and an internal cavity 235, wherein the piston body 232 includes a central axis 231, a control end 233, a flow-end 237 opposite the control end 233, a upper seal-engaging portion 240 proximal or adjacent the control end 233, and a lower seal-engaging portion 245 proximal or adjacent the flow-end 237. Similarly stated, the control end 233 of piston body 232 is disposed adjacent or proximal the upper seal-engaging portion 240 and distal the lower seal-engaging portion 245. The flow-end 237 of piston 230 includes a tapered face, or more generally, a contoured face 239 and a seating surface 238 adjacent lower seal-engaging portion 245. The upper seal-engaging portion 240 has a diameter that is less than the diameter of the lower seal-engaging portion 245. Due to the size difference between seal-engaging portions 240, 245, a first annular shoulder 250 is positioned between the portions 240, 245. First annular shoulder 250 faces in the same general direction as first end 233, i.e. as the end face of first end 233. Upper seal-engaging portion 240 includes a circumferential groove 242, and lower seal-engaging portion 245 includes a circumferential groove 246. Groove 242 is configured to receive and retain a first annular seal 285, as shown in the assembled control valve 200 of FIG. 2, and groove 246 is configured to receive and retain a second annular seal 286. Thus for control valve 200, seals 285, 286 couple to piston 230 for movement with piston 230. More particularly, second annular seal 286 is partially embedded within the wall of piston 230 as is first annular seal 285. At least in this embodiment, annular seals 285, 286 are resilient O-rings.

In the embodiment of FIG. 4, piston body 232 also includes a generally cylindrical intermediate portion 255 extending between the upper and lower seal-engaging portions 240, 245 and having a diameter less than the diameter of the upper and lower seal-engaging portion seal-engaging portions 240, 245. In some instances, the reduced diameter of intermediate portion 255 may reduce the friction between piston 230 and piston housing 210. Intermediate portion 255 shares the first annular shoulder 250 with lower seal-engaging portion 245 and forms a second, smaller annular shoulder 252 with upper seal-engaging portion 240. Thus, the smaller annular shoulder 252 is positioned between the upper seal-engaging portion 240 and intermediate portion 255 and faces the same axial direction as contoured face 239 of flow-end 237. Smaller annular shoulder 252 is smaller in diameter than the first annular shoulder 250.

Returning to FIG. 2, control valve 200 further includes a biasing member 275 and a valve seat 280 coupled to piston housing 210, forming an extension of open end 222. Valve seat 280 has a seating surface 282 generally facing toward head portion 215. Biasing member 275 is disposed between piston 230 and piston housing 210 and is configured to bias piston 230 in a direction away from the head portion 215. Valve seat 280 restrains the motion of piston 230 and biasing member 275 in one axial direction, and thereby couples biasing member 275 to both piston 230 and piston housing 210. As shown in FIG. 2, valve seat 280 is proximal the open end 222 of piston housing 210, and biasing member 275 is a coiled compression spring capable of exerting a spring force of, for example, between 5 and 10 pounds-force when piston 230 travels from the closed configuration to the fully open configuration. In some other embodiments, another biasing member 275 is selected with a spring force of less than 5 pounds-force or greater than 10 pounds-force but not so high so as to hold valve 200 closed during all designed or anticipated flow conditions of control system 100. Biasing member 275 is shown positioned partially within the internal cavity 235 of piston 230 and extending between inner end 236 of cavity 235 and a reaction surface, which is the inner surface of head portion 215. Biasing member 275 is generally aligned with central axis 221, surrounding the control port 270. The open end and open sidewall of coiled biasing member 275 allows control port 270 to maintain fluid communication with upper chamber 224.

In the assembly of FIG. 2, the first annular seal 285 is positioned or disposed within the upper chamber 224 and is positioned about the upper seal-engaging portion 240 of piston 230. Seal 285 is configured to engage sealingly the upper chamber 224 and piston portion 240. The second annular seal 286 is positioned within the lower chamber 226 and is positioned about the lower seal-engaging portion 245 of the piston 230. Seal 286 is configured to engage sealingly the lower chamber 226 and piston portion 245. For example, in instances when piston 230 is positioned as shown in FIG. 2, wherein the second annular seal 286 is disposed between piston portion 245 and non-perforated seal region 228 of extension 220, fluid communication between inlet 260 and fluid ports 265 is prevented. That is to say, in the configuration shown, the second annular seal 286 engages sealingly the lower chamber 226 and the piston 230, and control valve 200 is "closed."

In order to describe fluid forces acting on piston 230, three fluid zones within control valve 200 will be defined. A central fluid zone 290 is adjacent fluid ports 265, a control fluid zone 292 adjacent control port 270, and an inlet fluid zone 295 adjacent control valve inlet 260. In the embodiment of FIG. 2, central fluid zone 290 is in fluid communication with fluid ports 265; control fluid zone 292 is in fluid communication with control port 270; and inlet fluid zone 295 is in fluid communication control valve inlet 260. Fluid zone 290 extends axially between the first and second annular seals 285, 286. Central fluid zone 290 is a generally annular space between piston 230 and portions of upper and lower chambers 224, 226. For example, the narrow clearance between the wall of upper chamber 224 and the piston 230 defines a portion of fluid zone 290. In at least the embodiment of FIG. 2, the size, i.e. the volume, of central fluid zone 290 is variable and is based on the fixed distance between first and second annular seals and is based on the variable axial position of piston 230 within upper and lower chambers 224, 226. For example, the position of piston 230 along housing axis 221 influences what portion of upper chamber 224 and what portion of lower chamber 226 are disposed between the movable seals 285, 286, which bound the fluid zone 290. Therefore the axial position of piston 230 influences the size of fluid zone 290, at least in this embodiment.

Referring again to FIG. 1, a fluid, such as a liquid or air, as examples, disposed within flow control system 100 is capable of entering one of the fluid zones 290, 292, 295 in valve 200 and contacting various surface regions of piston 230 and various inner surface regions of piston housing 210. The pressure of the fluid, whether equal to, greater than, or less than atmospheric pressure, exerts forces on the fluid-exposed surface regions of piston 230 and piston housing 210. Stated more broadly, accounting for the opposing reactions of piston housing 210 and piston 230 including reaction forces and any motion of piston 230, the fluid exchanges forces with the various fluid-exposed surface regions within control valve 200. In other instances, air or another fluid exchanges forces with surfaces of piston 230 and inner surfaces of piston housing 210 when control valve 200 is alone and not coupled as a member of a control system 100. System 100 and control valve 200 may be configured to operate with a fluid having various pressures. In some instances, the fluid pressure many be within the range of 0 and 10,000 psig. Various embodiments of system 100 and control valve 200 are designed to operate within the pressure range of 0 to 200 psig. In other instances, system 100 and control valve 200 are designed to operate with a fluid having a different pressure.

The force exerted by the fluid and a particular surface region within control valve 200 is oriented perpendicular to that surface region and is distributed across that surface region. For flat, radially extending surface regions, such as the surface of the first annular shoulder 250, axial forces are exchanged with the fluid. If the surface region is curved, the force exerted by the fluid is everywhere perpendicular to the curved surface. For a surface region that is not strictly radially-extending and not strictly axially-extending, such as a curved or tapered surface for example, the total force exerted by the fluid on the surface region is resolvable, i.e. divisible, into a radial force and an axial force, i.e. a radial component and an axial component of the total force. The axial force of the fluid on a surface may be determined, for example, by evaluating the axially-projected area of the surface and then multiplying this result by the pressure of the fluid. Axial forces of the fluid on piston 230 influence the opening and closing of piston 230.

Referring to FIG. 2 and FIG. 4, piston 230 includes a plurality of fluid-exposed surface regions adjacent or within a fluid zone 290, 292, 295 and thereby configured to experience the pressure of the fluid in the respective fluid zone. The outermost surface regions of portions 240, 245, 255 face radially away from axis 231, giving them radially-projected surface area, configured to experience radial forces exerted by fluid pressure. As best shown in FIG. 4, some surface regions on piston 230 have axially-projected surface area perpendicular to axis 231, making them susceptible to axial forces from the fluid. In regard to control fluid zone 292, control end 233 of piston 230 and the inner end 236 of internal cavity 235 are fluid-exposed surface regions having a combined axially-projected surface area 234 configured to face toward head portion 215 of the piston housing 210. A portion of the inner end 236 is covered by biasing member 275; even so, this portion of inner end 236 experiences the pressure of the fluid in control fluid zone 292 indirectly through biasing member 275. Area 234 is a flat circle. In regard to inlet fluid zone 295, the second end 237 of piston 230 includes multiple fluid-exposed surface regions, for example seating surface 238 and contoured face 239, having a combined axially-projected surface area 247 configured to face toward the open end 222 of the piston housing 210. Area 247 is a flat circle.

In various embodiments, the axially-projected surface area 247 of second end 237 of piston 230 is at most 115% of the axially-projected surface area 234 associated with the control end 233 of piston 230. In some other embodiments, the axially-projected surface area 247 of second end 237 of piston 230 is at most 105% of the axially-projected surface area 234 associated with the control end 233 of piston 230. From this description, it is to be understood that in some embodiments, the axially-projected surface area 247 of second end 237 of piston 230 is greater than 115% of the axially-projected surface area 234 associated with the control end 233 of piston 230.

In regard to central fluid zone 290, the first annular shoulder 250 and the smaller annular shoulder 252 are configured for exposure to fluid in zone 290 and for fluid communication with fluid ports 265. The first annular shoulder 250 has an axially-projected surface area 251 configured to face toward head portion 215 of the piston housing 210. In this embodiment, the axially-projected surface area 251 of shoulder 250 is equal to the total surface area of shoulder 250. The smaller annular shoulder 252 has an axially-projected surface area 253 configured to face toward open end 222 of the piston housing 210. In this embodiment, the axially-projected surface area 253 of shoulder 252 is equal to the total surface area of shoulder 252. Areas 251, 253 are annular and flat. The axially-projected surface area 251 of the first annular shoulder 250 is greater than the axially-projected surface area 253 of the smaller annular shoulder 252

Figure 5:
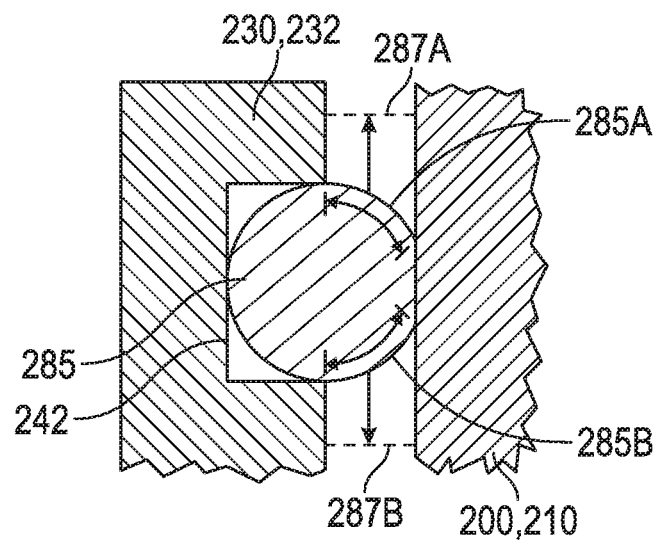
FIG. 5 is a close view, in cross-section, of the control valve of FIG. 2 showing a first seal between the piston and the piston housing in accordance with principles described herein.

As best seen in FIG. 5, first annular seal 285 is coupled to the upper seal-engaging portion 240 of piston 230 by engagement within groove 242. First annular seal 285 includes a surface region 285B configured for fluid communication with fluid ports 265, exposed to the fluid in central fluid zone 290, having an axially-projected surface area 287B that faces the open end 222 of the piston housing 210 and extends radially beyond piston 230 Annular seal 285 also includes a surface region 285A exposed to the fluid in control fluid zone 292 and having an axially-projected surface area 287A that faces the head portion 215 of the piston housing 210 and extends radially beyond piston 230.

Figure 6:
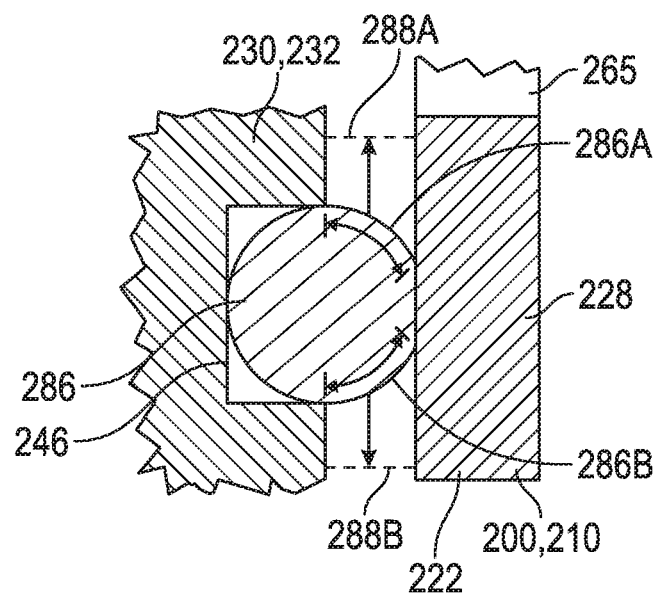
FIG. 6 is a close view, in cross-section, of the control valve of FIG. 2 showing a second seal between the piston and the piston housing in accordance with principles described herein.

Similarly, as best shown in FIG. 6, second annular seal 286 is couples to the lower seal-engaging portion 245 of the piston 230 by engagement within groove 246. Second annular seal 286 includes an annular surface region 286A configured for fluid communication with fluid ports 265, exposed to the fluid in central fluid zone 290, and having an axially-projected surface area 288A that faces the head portion 215 of the piston housing 210 and extends radially beyond piston 230. Annular seal 286 also includes a surface region 286B exposed to the fluid within inlet fluid zone 295 and having an axially-projected surface area 288B that faces toward the open end 222 of piston housing 210 and extends radially beyond piston 230.

Piston grooves 242, 246 also include various surface regions having axially-projected surface areas (not designated) facing toward head portion 215 or else toward open end 222 of piston housing 210. However these regions on grooves 242, 246 are either isolated from fluid by seals 285, 286, or else the axial fluid forces on these regions are counteracted by equal and opposite axial forces exerted on the portions of seals 285, 286 disposed within grooves 242, 246. Thus, the net axial force of fluid acting on grooves 242, 246 and seals 285, 286 is exerted on the surface regions corresponding to areas 287B, 287A, 288B, 288A of seals 285, 286 that extend radially beyond piston 230. The seals 285, 286 transfer fluid forces to piston 230 through the grooves 242, 246

Thus, as best shown in FIG. 4, FIG. 5, and FIG. 6 control valve 200 includes a plurality of surface regions configured to exchange axial forces between fluid and the piston 230, i.e. surface regions coupled to piston 230, having an axially-projected surface area and configured for exposure to fluid in valve 200. These surface regions are conceptually separable into two sets. Referring to FIG. 2 and FIG. 4, piston 230 and seals 285, 286 together include an upward-facing set of surface regions. Each surface region in the upward-facing set faces generally toward the head portion 215 and has an axially-projected surface area. Members of this upward-facing set include control end 233, and inner end 236, the first annular shoulder 250, region 285A of first annular seal 285, and region 286A of the second annular seal 286. The axially-projected surface areas associated with this upward-facing set include areas 234, 251, 287A, 288A. Piston 230 and seals 285, 286 also include a downward-facing set of surface regions. Each surface region in the downward-facing set faces generally toward the open end 222 of the piston housing 210 and has an axially-projected surface area. Members of this downward-facing set include surfaces 238, 239 of flow-end 237, the smaller annular shoulder 252, region 285B of first annular seal 285, and region 286B of the second annular seal 286. The axially-projected surface areas associated with this downward-facing set include areas 247, 253, 287B, 288B.

Various members of the previously described plurality of surface regions are disposed within central fluid zone 290 and are conceptually separable into two sets of surface regions, which are each subsets of the upward-facing set or the downward-facing set previously described. Each member of the first set of surface regions in the fluid zone 290 (i.e. adjacent, around, or inside the fluid zone 290) has an axially-projected surface area generally facing toward head portion 215 of the piston housing 210. Members of the first set include the first annular shoulder 250 and a region of the second annular seal 286, having areas 251, 288A, respectively. Each member of the second set of surface regions in the fluid zone 290 has an axially-projected surface area generally facing toward open end 222 of the piston housing 210. Members of second set include the smaller annular shoulder 252 and a region of the first annular seal 285, having areas 253, 287B, respectively. The collective, i.e. total, axially-projected surface area of the first set of surface regions in fluid zone 290 (e.g. sum of areas 251, 288A) exceeds the collective, i.e. total, axially-projected surface area of the second set of surface regions in fluid zone 290 (e.g. sum of areas 253, 287B). For example, in various embodiments, the total axially-projected surface area of the first set of surface regions in fluid zone 290 is at most 115% of the total axially-projected surface area of the second set of surface regions in fluid zone 290. In some other embodiments, the total axially-projected surface area of the first set of surface regions in fluid zone 290 is at most 105% of the total axially-projected surface area of the second set of surface regions in fluid zone 290. The difference in the total axially-projected surface area of the first set as compared to the second set biases the net axial force exerted on piston 230 by fluid in zone 290 to act toward open end 222 of piston housing 210, acting as a closing-force.

The tolerances of the machining processes used to form the surface regions of piston 230 and annular seals 285, 286 influence the total axially-projected surface area facing toward head portion 215 of the piston housing 210 and the total axially-projected surface area facing toward open end 222 in various embodiments of valve 200. Therefore, the first annular shoulder 250 is configured with sufficient axially-projected surface area 251 to insure that for the portion of piston 230 in fluid zone 290, the total axially-projected surface area facing toward head portion 215 is greater than the total axially-projected surface area facing toward open end 222, irrespective of the influence of the machining processes tolerances.

FIG. 7 shows some of the forces or force distributions exerted directly or indirectly on piston 230 by a fluid 300 that communicates with fluid ports 265. As shown, fluid 300 further communicates with fluid zone 290 and various surface regions on or adjacent to piston 230 that form a portion of the boundary of fluid zone 290. That is to say fluid 300 is present in fluid ports 265 and in fluid zone 290, and fluid 300 contacts various fluid-exposed surface regions within control valve 200. Fluid 300 is represented in this example by horizontal arrows entering or exerting pressure through fluid ports 265. In particular, FIG. 7 shows various axial forces 305, 310, 315, 320 exerted on piston 230 by fluid 300. The axial reactions of piston 230 and various other axial and radial forces are not shown in FIG. 7 for the sake of clarity. In some instances, FIG. 7 is represents control valve 200 while inactive and disconnected from a fluid system. In various other instances, FIG. 7 represents control valve 200 coupled as a member of flow control system 100 of FIG. 1. As presented in FIG. 7, control valve 200 is in a closed configuration in which the second annular seal 286 engaging sealingly the lower seal-engaging portion 245 and the second chamber 226.

The axially-projected surface areas 251, 288A of first annular shoulder 250 and second annular seal 286 both face head portion 215, and thus the pressure-induced axial forces 305, 310 of the fluid in zone 290 acting upon shoulder 250 and seal 286, respectively, are directed toward the open end 222 of piston housing 210 and act as closing-forces, tending to push piston 230 toward contact with valve seat 280. The axially-projected surface areas 253, 287B of the smaller annular shoulder 252 and first annular seal 285 both face the open end 222, and thus the pressure-induced axial forces 315, 320 of the fluid in zone 290 acting upon shoulder 252 and seal 285, respectively, are directed toward the head portion 215 of piston housing 210 and act as opening-forces, tending to push piston 230 away from valve seat 280.

Continuing to reference FIG. 7, control fluid zone 292 is configured to contain a fluid that is either the same as or different fluid from the fluid in zone 290. For example, in the embodiment of FIG. 1, zone 292 is configured to contain the same fluid as zone 290; albeit, the fluid pressure in zones 290, 292 differ in various instances. The axially-projected surface area 234 of control end 233 and inner end 236 of piston 230 faces head portion 215, and so ends 233, 236 are configured to exchange axial forces between the fluid in zone 292 and piston 230 with the fluid forces being directed toward the open end 222 and acting to close piston 230. So too, the axially-projected surface area 247 of flow-end 237 of piston 230 faces toward open end 222, and so flow-end 237 is configured to exchange axial forces between the fluid in zone 295 and piston 230 with the fluid forces being directed toward the head portion 215 and acting to open piston 230. Biasing member 275 exerts a closing force on piston 230, a force directed toward open end 222.

For control valve 200 to achieve or maintain the closed configuration of FIG. 7, the sum of all the closing-forces acting on piston 230 exceeds the sum of all the opening-forces acting on piston 230. Referring now only to the forces exerted by the fluid in fluid zone 290, for the disclosed embodiment, the sum of the closing-forces acting on piston 230 in zone 290 exceeds the sum of the opening-forces acting on piston 230 in zone 290, at least when the second annular seal 286 engages sealingly the lower chamber 226, as exemplified in the closed configuration of FIG. 7. Thus when valve 200 is in the closed configuration of FIG. 7, the net axial force on piston 230 in fluid zone 290 points or acts toward open end 222 and bias control valve 200 to the closed position. In various operation conditions, fluid pressures and resulting axial forces that are external to fluid zone 290 vary and cause valve 200 to open or to close. Fluid forces external to fluid zone 290 include an opening-force exerted by fluid in supply pipe 105 on contoured face 239 of piston 230, and a closing-force exerted by fluid communicating through control port 270 and acting upon the control end 233 and internal cavity 235 of piston 230. Preferably, piston 230 and valve 200 open when supply pressure P1 is greater than discharge pressure P2 and close when the opposite is true. Piston 230 and valve 200 are configured to close by the action of biasing member 275 when supply pressure P1 is equal to discharge pressure P2.

FIG. 8 shows an example of an open configuration for control valve 200 in which second annular seal 286 does not engage sealingly, i.e. does not "seal," the piston's lower seal-engaging portion 245 and the housing's lower chamber 226. In this open configuration, seal 286 contacts both piston 230 and the lower chamber 226 but does not engage non-perforated seal region 228 of extension 220. Instead, seal 286 is axially disposed adjacent the fluid ports 265. Consequently, control valve inlet 260 is in fluid communication with fluid ports 265. Referring again only to the forces exerted by the fluid in fluid zone 290, at least in some instances when second annular seal 286 does not form a seal, the sum of the closing-forces acting on piston 230 in zone 290 exceeds the sum of the opening-forces acting on piston 230 in zone 290.

Referring again FIG. 1 and FIG. 2, the axial position of piston 230 relative to piston housing 210 is influenced by at least these factors: the force of biasing member 275, fluid pressure P1 in inlet fluid zone 295, fluid pressure P2 in central fluid zone 290, and fluid pressure P3 in control fluid zone 292. In various instances, the relative magnitudes of pressures P1, P2, and P3 vary with time and vary with the axial position of piston 230. Thus, axial position of piston 230 and the pressures P1, P2, and P3 are interrelated. In various instances, as the axial position of piston 230 changes, control valve 200 varies between an open configuration (FIG. 7) and a closed configuration (FIG. 8).

Generally, when the pressure P1 in supply pipe 105 is less than or equal to the pressure P2 in discharge pipe 110, control valve 200 is closed, not allowing fluid communication between control valve inlet 260 and fluid ports 265 and, therefore, not allowing fluid communication between supply pipe 105 and discharge pipe 110. The closed configuration of control valve 200 is maintained, in part, by the axial force exerted by biasing member 275 on piston 230 and by the net axial force exerted on piston 230 by fluid in zone 290, that net axial fluid force acting toward open end 222, as previously described. As a result, fluid backflow from discharge pipe 110 to supply pipe 105 is prevented when control valve 200 is closed, and pressure P2 in discharge pipe 110 is greater than pressure P1 in supply pipe 105.

Figure 9:
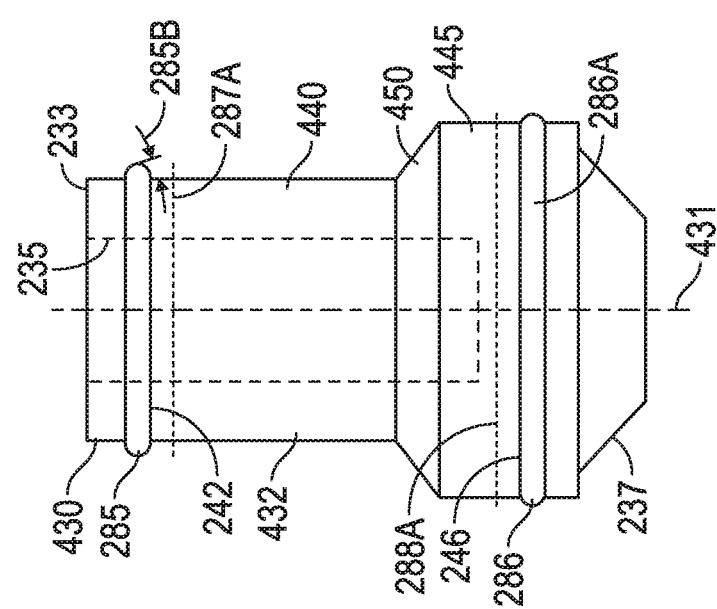
FIG. 9 is a side view of another embodiment of the piston for the control valve of FIG. 2 in accordance with principles described herein.

Referring now to FIG. 9, another embodiment having a surface area-compensated piston 430 for control valve 200 is shown. Piston 430 includes many features similar to the features of piston 230, such as a generally cylindrical body 432 and an internal cavity 235, wherein the piston body 432 includes a central axis 431, a control end 233, a flow-end 237 opposite the control end 233, a upper seal-engaging portion 440 proximal or adjacent the control end 233, and a lower seal-engaging portion 445 proximal or adjacent the flow-end 237. The upper seal-engaging portion 440 has a diameter that is less than the diameter of the lower seal-engaging portion 445. Due to the size difference between seal-engaging portions 440, 445, a tapered annular shoulder 450 extends between the portions 440, 445. Because it is tapered, shoulder 450 extends both radially and axially with respect to axis 431. Shoulder 450 faces generally in the same axial direction as first end 233. Upper seal-engaging portion 440 includes a circumferential groove 242 configured to receive a first annular seal 285, and lower seal-engaging portion 445 includes a circumferential groove 246 configured to receive a second annular seal 286. Thus, when prepared for installation in control valve 200, seals 285, 286 couple to piston 430 for movement with piston 430.

Unlike piston 230 described with reference to FIG. 4, piston 430 does not include a corresponding second shoulder facing in the same direction as flow-end 237 and positioned between seal-engaging portions 440, 445. That is the say; piston 430 does not include a shoulder like the smaller shoulder 252 of piston 230. Instead, shoulder 450 forms a transition between seal-engaging portions 440, 445. In this embodiment, due to the tapered configuration of shoulder 450, the axially-projected surface area 451 of shoulder 450 is less than the total surface area of shoulder 450. In other embodiments of piston 430, shoulder 450 is radially-extending but not axially-extending, having an axially-projected surface area that equals the total surface area of shoulder 450, which is a characteristic of shoulder 250.

Referring to both FIG. 2 and FIG. 9, when piston 430 is installed in control valve 200 in place of piston 230, the axially-projected surface area 451 of annular shoulder 450 faces the head portion 215 of the piston housing 210. When shoulder 450 is exposed to a fluid in central fluid zone 290, the fluid exerts a pressure-induced axial force, like force 305 of FIG. 7, directed toward the open end 222 of piston housing 210 and acting as a closing-force, tending to push piston 430 toward open end 222 and into contact with valve seat 280. A central fluid zone 290 (FIG. 2) extends between the first and second annular seals 285, 286, defining a generally annular space between piston 430 and portions of upper and lower chambers 224, 226. Fluid zone 290 is in fluid communication with the fluid ports 265.

Embodiments of control valve 200 having piston 430 include a plurality of surface regions configured to exchange axial forces between fluid and the piston 430, i.e. surface regions coupled to piston 430, having an axially-projected surface area and configured for exposure to fluid in valve 200. Various members of this plurality of surface regions are disposed within central fluid zone 290 and include annular shoulder 450 and surface regions 285B, 286A on annular seals 285, 286, respectively, (FIG. 5 and FIG. 6). These surface regions are conceptually separable into two sets. Each member of the first set of surface regions in central fluid zone 290 (i.e. adjacent, around, or inside the fluid zone 290) has an axially-projected surface area configured to face generally toward head portion 215 of the piston housing 210. Members of first set include at least a region of the surface of first annular shoulder 450 and surface region 286A of second annular seal 286, having axially-projected areas 451, 288A, respectively. Each member of the second set of surface regions in central fluid zone 290 has an axially-projected surface area configured to face generally toward open end 222 of the piston housing 210. The second set includes surface region 285B of first annular seal 285 having axially-projected area 287B. This second set has only one member in this embodiment. For any set of surface regions described herein, in some embodiments, the set may have only one member, i.e. only one contiguous surface region having an axially-projected surface area. The collective, i.e. total, axially-projected surface area of the first set of surface regions in fluid zone 290 (e.g. sum of areas 451, 288A) exceeds the total axially-projected surface area of the second set of surface regions in fluid zone 290 (e.g. the magnitude of area 287B). For example, in various embodiments, the total axially-projected surface area of the first set of surface regions in fluid zone 290 is at most 115% of the total axially-projected surface area of the second set of surface regions in fluid zone 290. In some other embodiments, the total axially-projected surface area of the first set of surface regions in fluid zone 290 is at most 105% of the total axially-projected surface area of the second set of surface regions in fluid zone 290.

The difference in the total axially-projected surface area of the first set as compared to the second set biases the net axial force exerted on piston 430 by fluid in zone 290 to act toward open end 222 of piston housing 210, acting as a closing-force. Similarly stated, the sum of the closing-forces acting on piston 430 in zone 290 exceeds the sum of the opening-forces acting on piston 430 in zone 290, at least when the second annular seal 286 engages sealingly the lower chamber 226. Because piston 430 has one less surface configured to face toward open end 222 as compared to piston 230 (i.e. no surface corresponding to smaller shoulder 252), the net axial force exerted by fluid on piston 430 is biased more strongly as a closing-force than the net axial force exerted by fluid on piston 230 in embodiments experiencing similar flow conditions.

Figure 10:
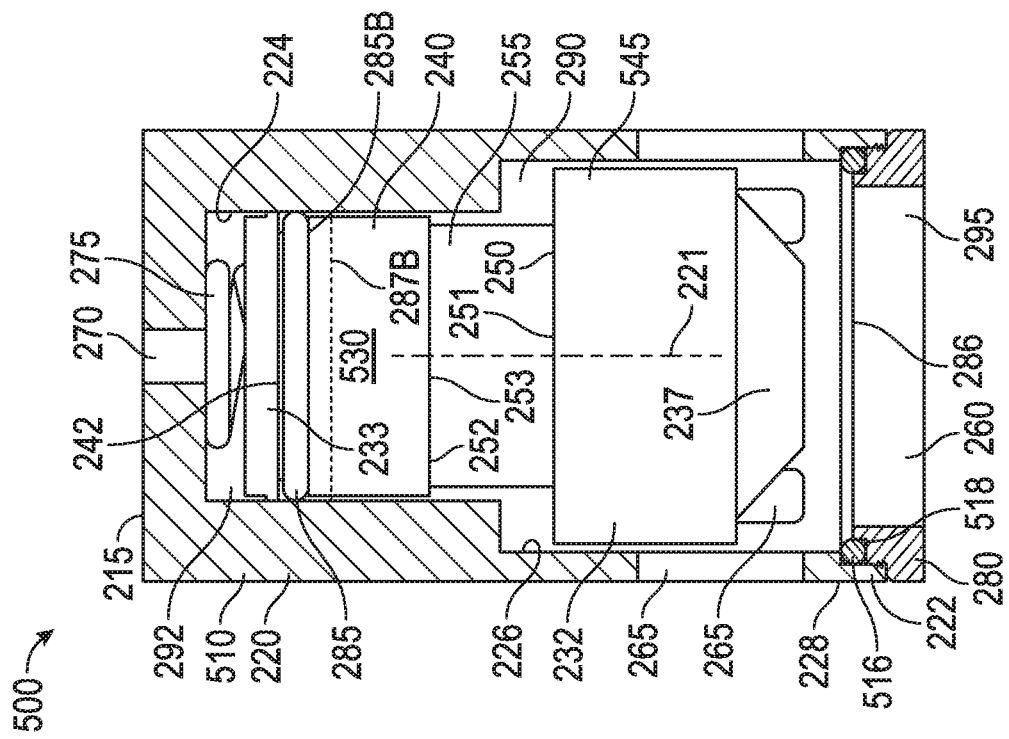
FIG. 10 is a side view, in partial cross-section, of an embodiment of the control valve of the flow control system of FIG. 1, shown in an open configuration, in accordance with principles described herein.

Referring now to FIG. 10, there is shown another surface area-compensated control valve 500 that may be employed in control system 100. In some embodiments, control valve 500 is installed as a sub-assembly of control valve 200 of FIG. 1. Control valve 500 includes a piston housing 510 in which is disposed a surface area-compensated piston 530 adapted for reciprocal motion along a central axis 221 to transition valve 500 between a closed configuration and an open configuration. In FIG. 10, valve 500 is shown in an open configuration.

Piston housing 510 includes many features similar to the features of piston housing 210 (FIG. 3), such as, for example, a head portion 215 and a hollow extension 220 having an open end 222 and upper cylindrical chamber 224, and a lower cylindrical chamber 226 that concentrically intersects upper chamber 224 along central axis 221. The upper chamber 224 is adjacent to the head portion 215 and has a diameter less than the diameter of the lower chamber 226. The lower chamber 226 is adjacent to the open end 222. A plurality of radially-extending fluid ports 265 extend radially through the sidewall of cylindrical extension 220, intersecting the lower chamber 226, i.e. perforating a portion of the extension 220. Fluid ports 265 are in fluid communication with portions of chambers 224, 226. In addition, piston housing 510 includes an internal, circumferential groove 516, located axially within a non-perforated seal region 228, adjacent open end 222 and inner surface that defines lower chamber 226. In the embodiment of FIG. 10, a valve seat 280 is threadingly engaged with open end 222 of housing extension 220 and includes an annular groove 518, extending radially outward, and axially disposed adjacent groove 516. Grooves 516, 518 form a corner pocket between lower chamber 226 and control valve inlet 260. Together, grooves 516, 518 are configured to receive and retain a second annular seal 286. Received corner pocket of grooves 516, 518 at an intersection of valve seat 280 and extension 220, the second annular seal 286 couples to piston housing 510. More particularly, seal 286 is partially embedded within the internal, cylindrical wall of hollow extension 220, and seal 286 is configured to remain stationary relative to piston housing 510. Of course, small movements of seal 286 within groove 516 are anticipated as piston reciprocates and engages and disengages from seal 286. In some other embodiments, seal 286 is axially displaced from valve seat 280. In this embodiment, annular seals 285, 286 are resilient O-rings.

Continuing to reference FIG. 10, piston 530 includes many features similar to the features of piston 230 (FIG. 4), such as, for example, a generally cylindrical body 232, a control end 233, a flow-end 237 opposite the control end 233, a upper seal-engaging portion 240 proximal or adjacent the control end 233, and a lower seal-engaging portion 545 proximal or adjacent the flow-end 237. The upper seal-engaging portion 240 has a diameter that is less than the diameter of the lower seal-engaging portion 545. A first annular shoulder 250 is positioned between the seal-engaging portions 240, 545, facing generally in the same direction as first end 233. Piston 530 also includes an intermediate portion 255 of reduced diameter extending between the upper and lower seal-engaging portions 240, 545. Intermediate portion 255 shares the first annular shoulder 250 with lower seal-engaging portion 545 and forms a second, smaller annular shoulder 252 with upper seal-engaging portion 240. Shoulder 252 faces the same general direction as flow-end 237.

Upper seal-engaging portion 240 of piston 530 includes a circumferential groove 242. Groove 242 is configured to receive and retain a first annular seal 285. Thus for control valve 500, first annular seal 285 couples to piston 530 for movement with piston 530. More particularly, first annular seal 285 is partially embedded within the exterior wall of piston 230. Unlike lower seal-engaging portion 245 of piston 230, in piston 530, the lower seal-engaging portion 545 does not include a circumferential groove to receive and retain an annular seal proximal the flow-end 237.

In the open configuration illustrated in FIG. 10, second annular seal 286 does not engage sealingly the piston's lower seal-engaging portion 545 and the housing's lower chamber 226. When valve 500 is open, seal 286 remains coupled to non-perforated seal region 228 of extension 220 and does not contact piston 230. Instead, piston 530 is axially displaced from valve seat 280 and seal 286, and control valve inlet 260 is in fluid communication with fluid ports 265 in the open configuration.

Control valve 500 includes a central fluid zone 290 adjacent fluid ports 265, a control fluid zone 292 adjacent control port 270, and an inlet fluid zone 295 adjacent control valve inlet 260. Central fluid zone 290 is in fluid communication with fluid ports 265; control fluid zone 292 is in fluid communication with control port 270; and inlet fluid zone 295 is in fluid communication control valve inlet 260. Fluid zones 290, 292, 295 describe locations where fluid forces act on piston 530. Central fluid zone 290 extends radially between various surface regions of piston 230 and various surface regions of upper and lower chambers 224, 226 and extends axially between the first and second annular seals 285, 286. In the embodiment of FIG. 10, the shape and volume of fluid zone 290 is configured to vary, at least in part, due to the relative movement of piston 530 and first annular seal 285 with respect to stationary second annular seal 286. Similarly stated, the size of central fluid zone 290 is variable based on the variable distance between first and second annular seals and based on the variable axial position of piston 530 within upper and lower chambers 224, 226. As a result, central fluid zone 290 is a generally annular when valve 500 is in a closed configuration and includes a generally cylindrical portion adjacent piston flow-end 237 in various instances when valve 500 is in an open configuration as exemplified in FIG. 10.

Continuing with reference to FIG. 10, control valve 500 includes a plurality of surface regions configured to exchange axial forces between fluid and the piston 530, i.e. surface regions coupled to piston 530, having an axially-projected surface area and configured for exposure to fluid in valve 500. Various members of this plurality of surface regions are disposed in central fluid zone 290 (i.e. adjacent, around, or inside the fluid zone 290). Such regions include annular shoulders 250, 252 and region 285B of first annular seal 285. (See also FIG. 5.) These various regions are conceptually separable into two sets. Each member of the first set of surface regions in central fluid zone 290 has an axially-projected surface area generally facing toward head portion 215 of the piston housing 510. The first set includes at least a region on the surface of first annular shoulder 250, having axially-projected area 251. This first set has only one member in this embodiment. Each member of the second set of surface regions has an axially-projected surface area generally facing toward open end 222 of the piston housing 510. The second set includes at least a region on the surface of smaller annular shoulder 252 and region 285B of first annular seal 285, having axially-projected areas 453, 287B, respectively. The total axially-projected surface area of the first set of surface regions in fluid zone 290 (e.g. the magnitude of area 251) exceeds the total axially-projected surface area of the second set of surface regions in fluid zone 290 (e.g. the sum of areas 453, 287B), at least when the second annular seal 286 engages sealingly the lower chamber 226 and piston 530. For example, in various embodiments, for example, the total axially-projected surface area of the first set of surface regions in fluid zone 290 is at most 115% of the total axially-projected surface area of the second set of surface regions in fluid zone 290. In some other embodiments, the total axially-projected surface area of the first set of surface regions in fluid zone 290 is at most 105% of the total axially-projected surface area of the second set of surface regions in fluid zone 290.

The net axial force on piston 530 is biased to act toward open end 222 of piston housing 510, acting as a closing-force, at least when the second annular seal 286 engages sealingly the lower chamber 226 and piston 530. Similarly stated, the sum of the closing-forces acting on piston 530 in zone 290 exceeds the sum of the opening-forces acting on piston 530 in zone 290 in the situation described. As stated earlier, in various embodiments, any set described herein may have only one member.

Figure 11:
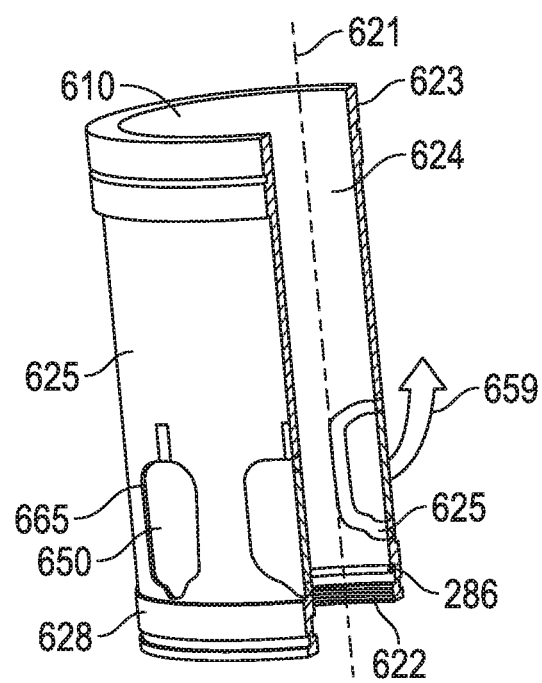
FIG. 11 is a perspective view in cross-section of a piston housing for a control valve compatible with the flow control system of FIG. 1, the piston housing having swinging doors in accordance, with principles described herein.
Figure 12:
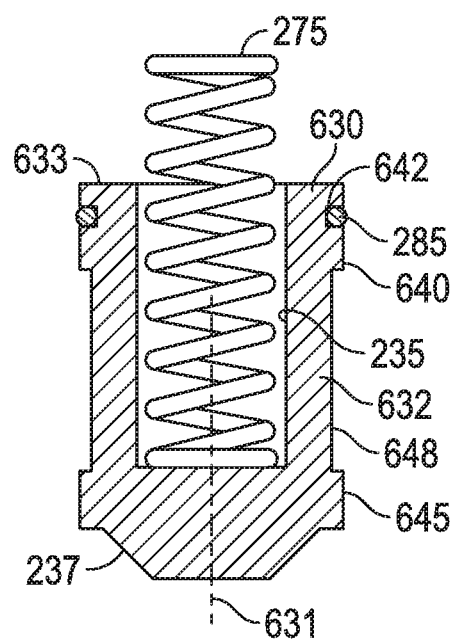
FIG. 12 is a side view, partially in cross section, of the piston compatible with the piston housing of FIG. 11 in accordance with principles described herein.

Referring now to FIG. 11 and FIG. 12, another embodiment of a piston housing and a surface area-compensated piston are shown. In this embodiment, piston housing 610 and surface area-compensated piston 630 are configured for installation as members of control valve 200 of FIG. 1 in place of piston housing 210 and piston 230 previously described. Piston housing 610 is hollow and includes a central axis 621, a generally-cylindrical sidewall 625, a lower or open end 622 and an upper end 623, and a cylindrical chamber 624 extending from the upper end 623 to the open end 622. A plurality of apertures or fluid ports 665 extend radially through the sidewall 625 proximal open end 622, perforating sidewall 625 and intersecting the lower end of chamber 624 for fluid communication. In practice, any suitable number of fluid ports 665 may be formed in the sidewall 625, including one, two, eight, 15, or more fluid ports 665, for example.

Between open end 622 and fluid ports 665, sidewall 625 includes an annular, non-perforated seal region 628. When installed in control valve 200 of FIG. 1, the upper end 623 of piston housing 610 is held axially by the removable end 208 of valve 200, through which control port 270 extends, placing the upper end of chamber 624 in fluid communication with control port 270. Upper end 623 is closed by removable end 208 in at least some embodiments.

Figure 13:
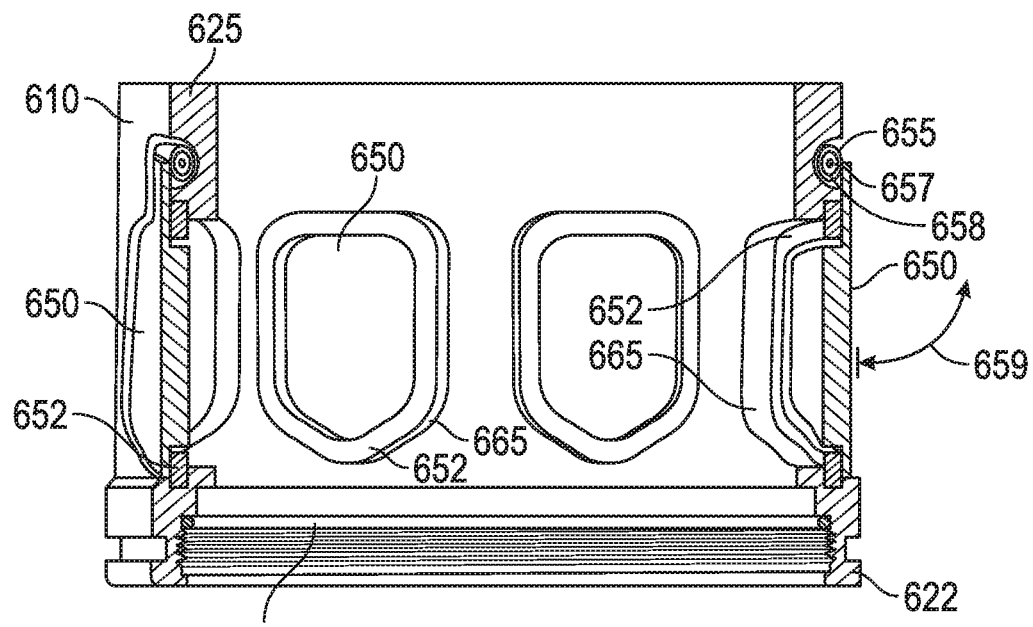
FIG. 13 is a rotated and enlarged view, in cross-section, of the piston housing shown in FIG. 11.

As best shown in FIG. 13, piston housing 610 further includes a plurality of doors 650 and a plurality of door seals 652 positioned between the housing sidewall 625 and one of the doors. Doors 650 are curved to match the curvature of piston housing 610 about central axis 621. Each door 650 is coupled to the sidewall 625 adjacent one of the ports 665 by a hinge 655. Hinges 655 are positioned axially between doors 650 and upper end 623. For convenience during installation, hinges 655 are embedded in recesses in sidewall 625 and do not extend radially beyond sidewall 625 when doors 650 are closed. Hinges 655 include an axis of rotation 657 oriented generally tangent to cylindrical sidewall 625. Each hinge 655 also include a biasing member 658 configured to bias the corresponding door 650 into engaged with door seal 652 and fluid port 665. Doors 650 are configured to swing in a direction 659 outward and upward from ports 665, and to swing back to contact door seal 652, depending on flow conditions. In this way, each door 650 is configured to seal selectively one of the ports 665.

Referring again to FIG. 12, piston 630 includes a generally cylindrical body 632 and an internal cavity 235. Piston body 632 includes a central axis 631, a control end 633, a flow-end 237 opposite the control end 633, an upper seal-engaging portion 640 proximal or adjacent the control end 633, and a lower seal-engaging portion 645 proximal or adjacent the flow-end 237. The upper seal-engaging portion 640 has a diameter that is substantially the same as the diameter of the lower seal-engaging portion 645. Upper seal-engaging portion 640 includes a circumferential groove 642, configured to receive and retain an annular seal 285. Thus, seal 285 couples within the wall of piston 630 so as to move with piston 630. In this embodiment, annular seal 285 is a resilient O-ring. Piston body 632 also includes a generally cylindrical intermediate portion 648 extending between the upper and lower seal-engaging portions 640, 645 and having a diameter less than the diameter of the upper and lower seal-engaging portions 640, 645. In some instances, the reduced diameter of intermediate portion 648 may reduce the friction between piston 630 and piston housing 610.

A biasing member 275 is disposed within cavity 235 of piston 630 and configured to extend between piston 630 and removable end 208 of valve 200 to bias piston 630 in a direction away from removable end 208. An annular seal 286 is received within a groove 516 within open end 622 of piston housing 610. Though not shown in FIG. 13, a valve seat 280, similar to seat 280 of FIG. 10, threadingly engages open end 622 to retain the seal 286 and to retain piston 630 when installed within chamber 624. Open end 622 and the valve seat 280 define a control valve inlet 260 for piston housing 610 similar to the valve inlet 260 shown in FIG. 10 and indicated in FIG. 1. When assembled within housing 610, piston 630 is positioned between control valve inlet 260 and fluid ports 665 and is adapted for reciprocal motion along central axis 621 to allow and then, alternately, to prevent fluid communication between inlet 260 and fluid ports 665.

Figure 14:
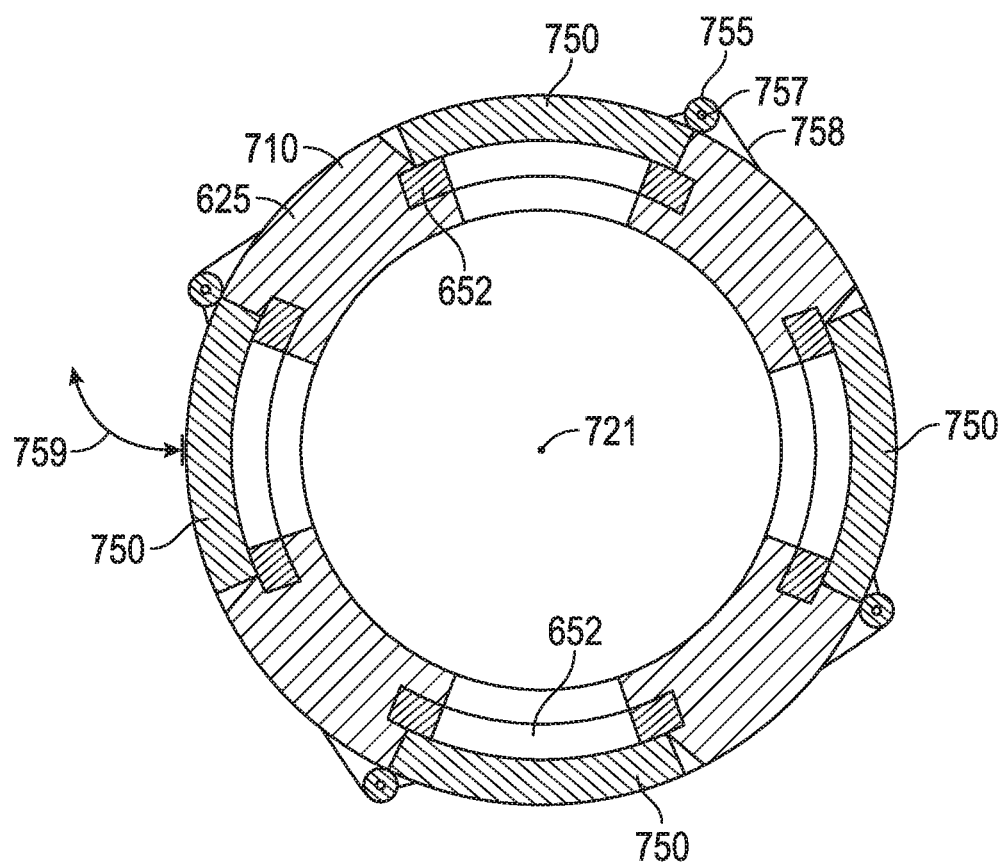
FIG. 14 is a top view in cross-section of a piston housing for a control valve compatible with the flow control system of FIG. 1, the piston housing having swinging doors, in accordance with principles described herein.

FIG. 14 presents a piston housing 710 that is configured for operation with piston 630 of FIG. 12 and is configured for installation within control valve 200 of FIG. 1 in place of piston housing 210 and piston 230. Like piston housing 610 (e.g. FIG. 11), housing 710 also includes swinging doors, but the direction of swinging differs. Piston housing 710 assembles with a piston 630 and a biasing member 275 (FIG. 12) as does piston housing 610. Piston housing 710 includes central axis 721 and several features similar to the features of piston housing 610. As examples, piston housing 710 includes a generally-cylindrical sidewall 625, a lower or open end 622 and an upper end 623, a cylindrical chamber 624 extending from the upper end 623 to the open end 622, and a plurality of apertures or fluid ports 665. Not all of these features are visible in the top view of FIG. 14. Ports 665 extend radially through the sidewall 625 proximal open end 622, perforating sidewall 625 and intersecting the lower end of chamber 624 for fluid communication. When installed in control valve 200 of FIG. 1, the upper end 623 of piston housing 710 is held axially by the removable end 208 of valve 200, through which control port 270 extends, placing the upper end of chamber 624 in fluid communication with control port 270.

Piston housing 710 further includes a plurality of doors 750 and a plurality of door seals 652 positioned between the housing sidewall 625 and one of the doors. The example of FIG. 14 includes four doors 750. Doors 750 are curved to match the curvature of piston housing 710 about central axis 721. Each door 750 is coupled to the sidewall 625 adjacent one of the ports 665 by a hinge 755. Hinges 755 are positioned axially adjacent doors 750. Hinges 755 include an axis of rotation 757 oriented parallel to central axis 721. Each hinge 755 also include a biasing member 758 configured to bias the corresponding door 750 into engaged with door seal 652 and fluid port 665. Doors 750 are configured to swing in a direction 759 outward from ports 665, and to swing back to contact door seal 652, depending on flow conditions. In this way, each door 750 is configured to seal selectively one of the ports 665. The door seals 652 of FIG. 14 may differ in shape from the door seals 652 of FIG. 13.

Though not shown in FIG. 13, similar to the embodiments of FIG. 10 and FIG. 11, a valve seat 280 threadingly engages open end 622 to retain an annular seal 286 and to retain a piston 630 when installed within chamber 624 of piston housing 710. Piston housing 710, open end 622, and the valve seat 280 define a control valve inlet 260 for piston housing 710 similar to the valve inlet 260 shown in FIG. 10 and indicated in FIG. 1. When assembled within housing 710, piston 630 is positioned between control valve inlet 260 and fluid ports 665 and is adapted for reciprocal motion along central axis 721 to allow and then, alternately, to prevent fluid communication between inlet 260 and fluid ports 665.

When installed within valve body 205 of control valve 200 shown in FIG. 1, the respective doors 650, 750 of piston housing 610, 710 (FIG. 11 and FIG. 14) aided by door seals 652 alternately allow and prevent fluid communication through fluid ports 665, isolating piston 630 from discharge pipe 110 when pressure P2 in discharge pipe 110 is greater than pressure P1 in supply pipe 105 and valve 200 closes. Consequently, in various instances, closed doors 650, 750 prevent fluid pressure P2 of discharge pipe 110 from acting on piston 630 and possibly moving piston 630, insuring that biasing member 275 keeps piston 630 seated against seal 286 and valve seat 280 to maintain a close configuration for valve 200. Thus, fluid backflow from discharge pipe 110 to supply pipe 105 is prevented when pressure P2 in discharge pipe 110 is greater than pressure P1 in supply pipe 105. Doors 650, 750 of piston housing 610, 710 are configured to isolate control valve 200 from the influence of the machining tolerances or the dimensional inaccuracies of the various surface regions of piston 630.

Figure 15:
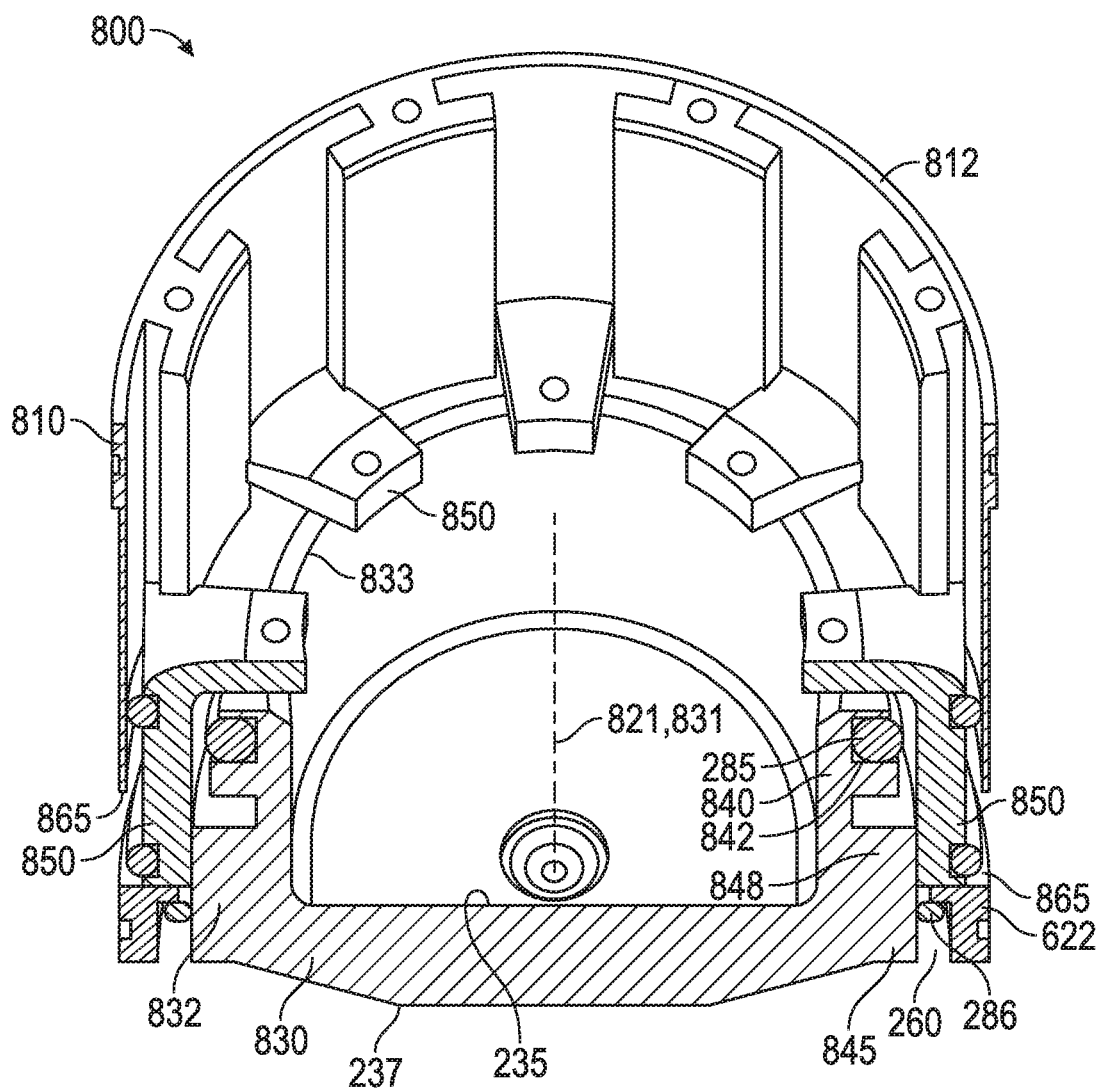
FIG. 15 is a perspective view in cross-section of a control valve compatible with the flow control system of FIG. 1, the valve being shown in a closed configuration.

Referring now to FIG. 15, there is shown another control valve 800 that may be employed in control system 100. In some embodiments, control valve 800 is installed as a sub-assembly of control valve 200 of FIG. 1. Control valve 800 includes a piston housing 810 in which is disposed a surface area-compensated piston 830 adapted for reciprocal motion along a central axis 821 to transition valve 800 between a closed configuration and an open configuration. In FIG. 15, valve 800 is shown in a closed configuration. Most notably, piston housing 810 includes a plurality of sliding doors 850 coupled to piston 830.

Figure 16:
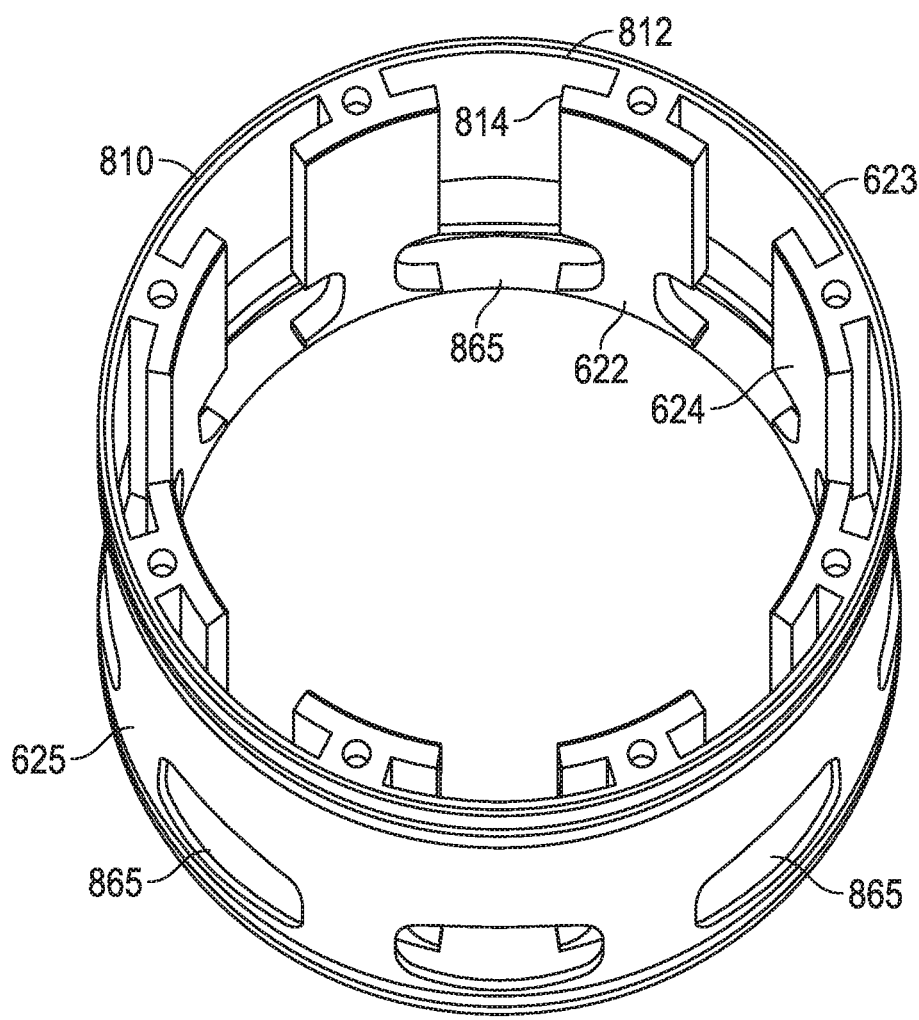
FIG. 16 is a perspective view of the piston of the control valve shown in FIG. 15.

As best shown in FIG. 16, piston housing 810 includes several features similar to the features of piston housing 610 such as, for example, a generally-cylindrical sidewall 625, a lower or open end 622 and an upper end 623, a cylindrical chamber 624 extending from the upper end 623 to the open end 622, and a plurality of circumferentially spaced apertures or fluid ports 865. Ports 865 extend radially through the sidewall 625 proximal open end 622, perforating sidewall 625 and intersecting the lower end of chamber 624 for fluid communication. Piston housing 810 further includes an axially extending channel 812 disposed within sidewall 625, intersecting each fluid port 865 and upper end 623. When viewed from upper end 623, channels 812 have a T-shaped structure, and therefore channels 812 may also be called T-shaped channels 812. The base 814 of the "T" of channels 812 extends radially to chamber 624. T-shaped channels 812 are curved to match the curvature of sidewall 625.

Piston 830 includes a generally cylindrical body 832 and an internal cavity 235. Piston body 832 includes a central axis 831, a control end 833, a flow-end 237 opposite the control end 833, an upper seal-engaging portion 840 proximal or adjacent the control end 833, and a lower seal-engaging portion 845 proximal or adjacent the flow-end 237. The upper seal-engaging portion 840 has a diameter that is substantially the same as the diameter of the lower seal-engaging portion 845. Upper seal-engaging portion 840 includes a circumferential groove 842, configured to receive and retain an upper annular seal 285. Thus, seal 285 couples within the wall of piston 830 so as to move with piston 830. Piston body 832 also includes a generally cylindrical intermediate portion 848 extending between the upper and lower seal-engaging portions 840, 845 and having a diameter that is substantially the same as the diameter of the upper and lower seal-engaging portions 840, 845. Piston 830 further includes a cavity 235 configured to receive a biasing member 275 (FIG. 1) to extend between piston 830 and removable end 208 of valve 200 to bias piston 830 in a direction away from removable end 208.

Figure 17:
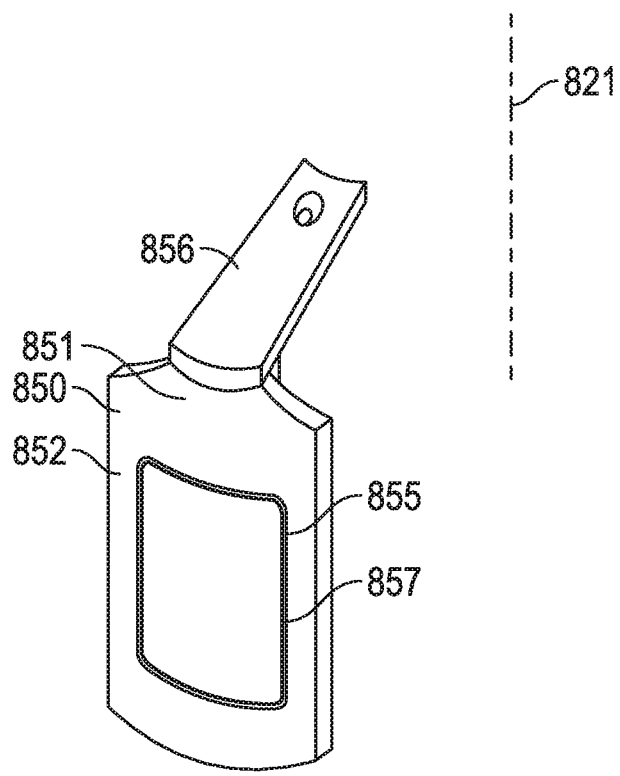
FIG. 17 is a perspective view of a sliding door of the control valve shown in FIG. 15.
Figure 18:
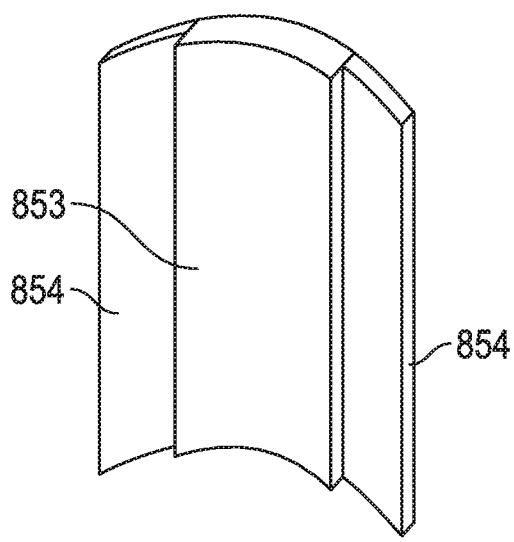
FIG. 18 is another perspective view of a sliding door of the control valve shown in FIG. 15.

Referring now to FIG. 17 and FIG. 18, doors 850 are curved to match the curvature of sidewall 625 and channels 812. Each door 850 includes an axially-extending body portion 851 having a central portion 853 that extends radially inward, two axially extending wings 854, one on each side of central portion 853, a radially outer surface 852 spanning across central portion 853 and wings 854, a seal groove 855 in the outer surface 852, an attachment arm 856 extending radially from the top edged of each door 850. A door seal 857 is received and held within seal groove 855. Measured relative to central axis 821, attachment arms 856 have the same angular width as central portion 853.

As shown in FIG. 15, each door 850 is coupled to piston 830. In this embodiment, the coupling between door 850 and piston 830 is achieved at attachment arm 856. Door 850 and its attachment arm 856 are slidingly received within a T-shaped channel 812 with attachment arm 856 extending radially through base 814 of T-shaped channel 812 and extending into chamber 624. Door seal 857 is positioned between the outer surface 852 of door 850 and the corresponding channel 812 in housing sidewall 625. Doors 850 are configured to move axially with piston 830, and door seals 857 are configured to move with doors 850. With this arrangement, each pair of door 850 and door seal 857 is configured to seal selectively one of the ports 865. In some embodiments, at least one of the door seals 857 is instead to be held at a generally fixed position around ports 865 rather than being embedded in a seal groove 855 on the door 850.

Though not shown in FIG. 15, similar to the embodiments of FIG. 10 and FIG. 11, a valve seat 280 threadingly engages open end 622 to retain an annular seal 286 and to retain a piston 830 when installed within chamber 624 of piston housing 810. Piston housing 810, open end 622, and the valve seat 280 define a control valve inlet 260 for piston housing 810 similar to the valve inlet 260 shown in FIG. 10 and indicated in FIG. 1. When assembled within housing 810, piston 830 and doors 850 are positioned between control valve inlet 260 and fluid ports 865 and is adapted for reciprocal motion along central axis 821 to allow and, alternately, to prevent fluid communication between inlet 260 and fluid ports 865.

When installed as a sub-assembly of control valve 200 in FIG. 1, the upper end 623 of piston housing 810 is held axially by the removable end 208 of valve 200, through which control port 270 extends, placing the upper end of chamber 624 in fluid communication with control port 270. In some embodiments, piston housing 810 includes a separate head portion coupled to upper end 823, similar to head portion 215 of piston housing 210 in control valve 200 (FIG. 3) or head portion 215 of piston housing 510 in control valve 500 (FIG. 10).

Referring to FIG. 15 and FIG. 1, the operation of control valve 800 when installed as a sub-assembly of control valve 200 is similar to the operation previously described for piston housings 610, 710 with piston 630 ((FIG. 11, FIG. 14, and FIG. 12). Doors 850 of piston housing 850 aided by door seals 852 alternately allow and then prevent fluid communication through fluid ports 865, isolating piston 830 from discharge pipe 110 when pressure P2 is greater than pressure P1 in supply pipe 105, and valve 200 closes. Consequently, in various instances, closed doors 850 prevent fluid pressure P2 of discharge pipe 110 from moving piston 830, insuring that biasing member 275 keeps piston 830 seated against seal 286 and valve seat 280 to maintain a close configuration for valve 200. Thus, fluid backflow from discharge pipe 110 to supply pipe 105 is prevented when pressure P2 in discharge pipe 110 is greater than pressure P1 in supply pipe 105. Doors 850 of piston housing 810 are configured to isolate control valve 200 from the influence of the machining tolerances or the dimensional inaccuracies of the various surface regions of piston 830.

Figure 19:
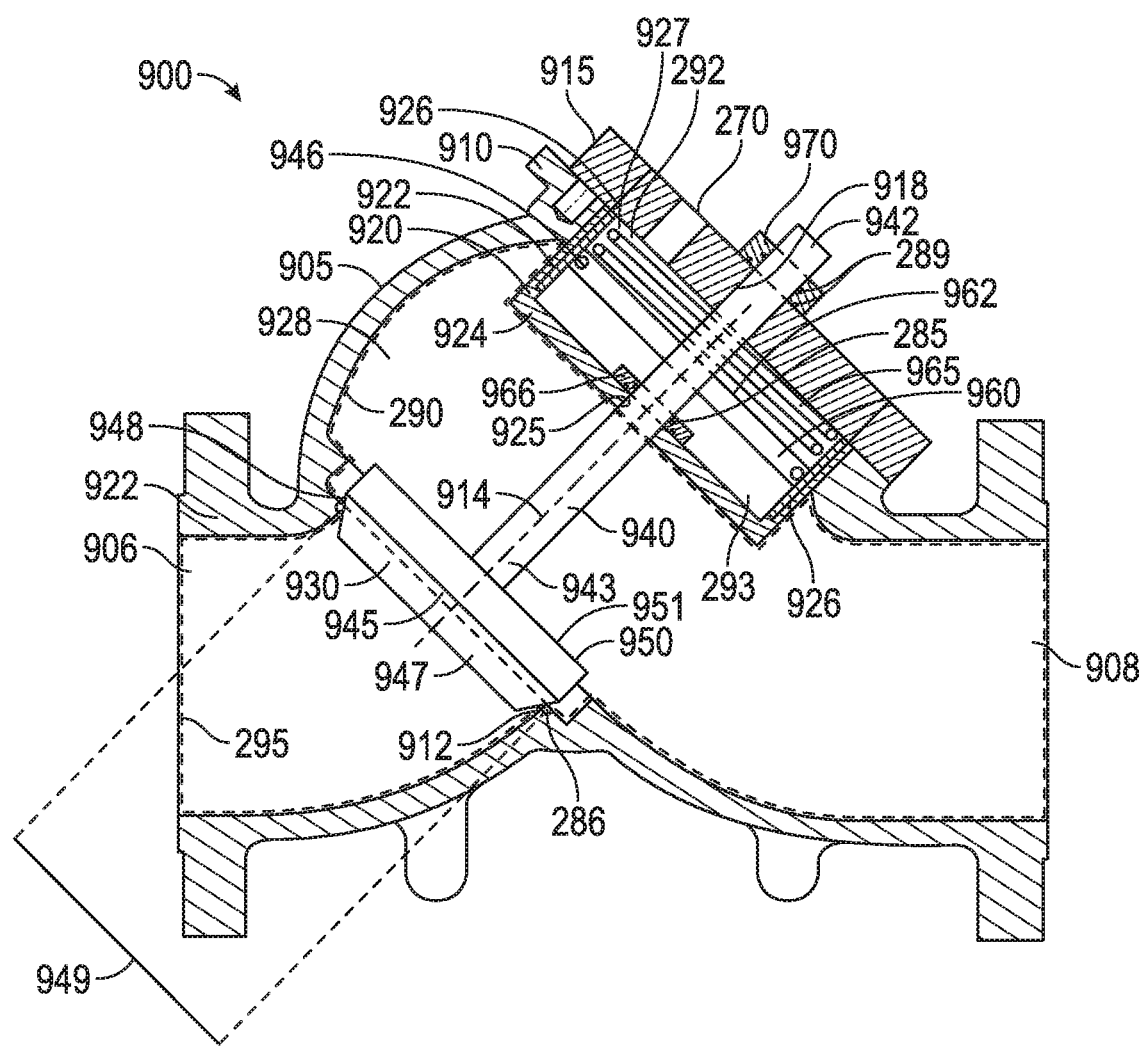
FIG. 19 is a side view, in partial cross-section, of a control valve compatible with the flow control system of FIG. 1, shown in a closed configuration, in accordance with principles described herein.

FIG. 19 presents yet another embodiment of a control valve that may be employed in control system 100 of FIG. 1 in place of control valve 200, for example. In this embodiment, a control valve 900 includes a valve body 905, a removable head portion 915 coupled to valve body 905, an intermediate housing member 920 positioned within valve body 905, and a surface area-compensated piston 930 positioned within valve body 905. In the embodiment of FIG. 19, valve body 905 is similar or identical to valve body 205 of valve 200 described with reference to FIG. 1.

The valve body 905 includes a control valve inlet or open end 906, a control valve exit 908, which may be called a discharge fluid port, displaced from inlet 906, an upper or control end 910 having an opening and located generally between and above inlet 906 and exit 908. Valve body 905 also includes an annular valve seat 912 disposed near inlet 906, and a piston axis 914 extending through the valve seat 912 and the opening of control end 910. For convenience, control end 910 may also be called the "first end," and open end 906 may also be called the "second end." Unlike some embodiments disclosed herein, control valve 900 of FIG. 19 does not include both valve body 905 and an additional piston housing surrounding a majority of piston 930. However, the valve body 905 performs as a piston housing, and thus may be called a piston housing.

Removable head portion 915 covers control end 910 of body 905 and couples or restrains intermediate housing member 920 and piston 930 within body 905. Removable head portion 915 includes a control port 270 and an axially disposed aperture 918.

The intermediate housing member 920 is cylindrical and hollow having a first or upper end 922 disposed adjacent head portion 915 and having an end plate 924 located opposite upper end 922. An aperture 925 aligned with axis 914 extends through end plate 924. A plurality of vents 926 extend axially through head portion 915 and through a portion of the sidewall of intermediate housing member 920 but not passing through end plate 924. At a position adjacent end plate 924, vents 926 turn and extend radially through the inner surface of member 920. FIG. 19 shows two vents 926, but other embodiments may have only one vent or may have, three, four, five, or any practical number of vents 926.

Within hollow housing member 920 and valve body 905, a first, upper chamber 927 at control end 910 extends from end plate 924 to head portion 915. Also within valve body 905, a second, lower chamber 928 extends generally from valve seat 912 to at least the outer surface of housing member 920. Lower chamber 928 is proximal the inlet 906, i.e. the open end, as compared to upper chamber 927. Lower chamber 928 is in fluid communication with control valve exit 908, i.e. the discharge fluid port, and is in fluid communication with discharge pipe 110 when installed in control system 100. Lower chamber 928 is separated from upper chamber 927 by intermediate housing member 920, but, at least in the absence of piston 930, aperture 925 in end plate 924 intersects and interconnects chambers 927, 928. In a broad sense, aperture 925 may also be called an intermediate chamber.

Still referencing FIG. 19, piston 930 is formed as a piston rod 940 having a first or upper end 942 and a second or lower end 943, a lower disc 945 coupled to rod first end 942, and an upper disc 960 coupled at a selected position along the length of rod 940. Piston rod 940 extends along piston axis 914. Piston rod 940 has a smaller diameter than either disc 945, 960. The interface between upper disc 960 and rod 940 prevents fluid communication therebetween. In the embodiment shown in FIG. 19, upper disc 960 has a larger diameter than lower disc 945. However, in some other embodiments, upper disc 960 has a smaller diameter than lower disc 945 or has a diameter equal to the diameter or disc 945. For some embodiments, piston rod 940 is also called a first seal-engaging portion or intermediate seal-engaging portion due to its position; lower disc 945 is also called a second or lower seal-engaging portion, and upper disc 960 is also called a third or upper seal-engaging portion.

A first annular bushing 966 is aligned with piston axis 914 and is positioned on end plate 924 within upper chamber 927 within housing member 920. Bushing 966 is configured to impede or prevent a fluid from flowing between the upper chamber 927 and the lower chamber 928. Bushing 966 slidingly receives piston rod 940 with a first annular seal 285 sealingly engaging piston rod 940. A second annular bushing 970 is aligned with piston axis 914 and is coupled to head portion 915 outside valve body 905 to impede or prevent a fluid present in the upper chamber 927 from exiting valve body 905. Bushing 970 slidingly receives piston rod 940 with an annular seal 289 sealingly engaging piston rod 940. Bushing 970 may be similar or identical to bushing 966, and seal 289 may be similar or identical to seal 285. Closer to control valve inlet 906, an annular seal 286 is coupled to valve seat 912 and may be called the "second annular seal" for some embodiments.

In the assembly of control valve 900, piston 930 is positioned between control valve inlet 906 and exit 908. Piston 230 is adapted for reciprocal motion along central axis 914 within housing 905 to allow fluid communication between inlet 906 and exit 908 in an open configuration, and, alternately, to prevent fluid communication between inlet 906 and exit 908 in the closed configuration. Thus, piston 930 is configured to transition valve 900 between closed and opened positions. In FIG. 19, valve 900 is shown in the closed configuration in which a flow-end 947 of lower seal-engaging portion 945 engages second annular seal 286 at valve seat 912. The closed configuration for valve 900 may be equivalently described as a condition in which second annular seal 286 sealingly engages lower chamber 928 and lower seal-engaging portion 945 of piston 930. A biasing member 965, which is exemplified in FIG. 19 by a coil spring, is configured to bias piston 930 away from upper end 910. In FIG. 19, biasing member 965 is installed within upper chamber 927 to act between piston upper 960 disc and head portion 915 at control end 933.

On lower disc 945, an outermost annular lip 948 of piston flow end 947 extends radially beyond seal 286, and the lip 948 remains in fluid communication with lower chamber 928 so that any fluid in lower chamber 928 acts against the axially-projected surface area 949 of lip 948 even while the valve is closed. Piston flow-end 947, including area 949, faces towards open end 906, i.e. the control valve inlet. Surface area 949 is flat and annular in shape. Lower disc 945 also includes an annular shoulder 950 adjacent piston rod 940. Shoulder 950 has an axially-projected surface area 951 facing toward head portion 915 and control end 906 of piston housing 210. Upper disc 960 is disposed within the upper chamber 927 and the intermediate housing member 920. An annular seal 946 sealingly engages upper disc 960 and the inner wall of housing member 920, dividing upper chamber 927 into two zones, which will be described later.

The assembly of control valve 900 includes four fluid zones: a central fluid zone 290, a control fluid zone 292, vented fluid zone 293, and an inlet fluid zone 295. In this embodiment, central fluid zone 290 extends axially between the first and second annular seals 285, 286, generally corresponding to lower chamber 928 and the lower section of intermediate chamber 925 (i.e. aperture 925). Central fluid zone 290 is adjacent and is in fluid communication with control valve exit or discharge fluid port 908. A control fluid zone 292 extends axially between head portion 215 and seal 946 on upper disc 960, corresponding to an upper portion of the upper chamber 927. Upper disc 960 and zone 292 are in fluid communication with control port 270. Upper disc 960 may also be called the control end of piston 930. The vented fluid zone 293 extends between annular seals 285 on first annular bushing 966 and seal 946 on upper disc 960, corresponding to a lower portion of the upper chamber 927 inside intermediate housing member 920. Vents 926 in the sidewall of intermediate housing member 920 provide fluid communication between vented fluid zone 293 and the ambient conditions outside control valve 900, which may be, for example, air at atmospheric pressure and temperature. Thus, an ambient fluid may be exchanged between zone 293 and the ambient volume outside control valve 900. The inlet fluid zone 295 includes control valve inlet 260 and extends to second annular seal 286 at valve seat 912. The sizes of some fluid zones are variable as piston 930 reciprocates.

Control valve 900 includes a plurality of surface regions configured to exchange axial forces between a fluid and the piston 930, i.e. surface regions of piston 930 having an axially-projected surface area and configured for exposure to fluid in valve 900. Among these, a first set of surface regions on piston 930 is disposed in central fluid zone 290, each surface region having an axially-projected surface area generally facing toward upper end 910 of the piston housing 905 (i.e. valve body 905), and facing toward head portion 915. A second set of surface regions on piston 930 is also disposed in central fluid zone 290, each surface region having an axially-projected surface area generally facing toward open end 922 of housing 905. Members of the second set of surface regions face in opposite the direction of members of the first set. In the embodiment of FIG. 19, because second annular seal 286 is fixed to valve seat 912, and because seal 286 defines the lower bounds of fluid zone 290, portions of piston 930 move between central fluid zone 290 and inlet fluid zone 295 during valve operation. Thus, for convenience, the members of the first set and the second set of surface regions in zone 290 will be defined based on the closed configuration of valve 900. The first set of surface regions in zone 290 includes the axially-projected surface area 951 of piston shoulder 950. The second set of surface regions in zone 290 includes the axially-projected surface area 949 of the outermost annular lip 948 of piston flow-end 947. In FIG. 19, no feature on intermediate seal-engaging portion 940, and no feature on upper seal-engaging portion 960 includes an axially-projected surface area within central fluid zone 290. Moreover, the upper seal-engaging portion, i.e. disc 960, is sealed from the lower chamber 928 and the corresponding fluid zone 290 by first annular bushing 966. Thus, in this embodiment, the first and second sets of surface regions each have one member, but some embodiments may include more members in the first set or in the second set.

To stabilize control valve 900 when it is closed, the total axially-projected surface area of the first set of surface regions in central fluid zone 290 exceeds the total axially-projected surface area of the second set of surface regions in fluid zone 290. More specifically, the axially-projected surface area 951 of piston shoulder 950 exceeds the axially-projected surface area 949 of outermost annular lip 948 within central fluid zone 290. As a result, at least when valve 900 is in a closed configuration, the net axial force exerted on piston 930 by a fluid in central fluid zone 290 acts toward open end 922 of piston housing 910, acting as a biased, closing-force.

During operation of control valve 900, a control fluid entering through control port 270 may act on the upper surface 962 of upper disc 960 to regulate the behavior of valve 900. The force exerted by the control fluid is directly proportional to the axially-projected area of upper surface 962. When designing an embodiment of valve 900, the axially-projected area of upper surface 962 may be varied independently of the surface area of the portions of piston 930 located in central fluid zone 290, which include the previously-described first set of surface regions and second set of surface regions. This independence of the upper surface 962 along with the isolation of upper disc 960 from fluid communication with fluid zone 290 means that designing or achieving a desirable balance of forces on piston 930 (i.e. axial forces due to fluid pressures within central fluid zone 290, control fluid zone 292, and inlet fluid zone 295 and the force due to biasing member 965, for example) may be easier or more robust than for conventional control valves, or may be easier or more robust than for various other embodiments described herein. An evaluation of the balance of forces on piston 930 considers the magnitude of the net axial force acting on piston 930 for at least one axial positions of piston 930 and during at least one operation condition. Having a desirable balance of forces for piston 930 may be advantageous to proper valve operation. An evaluation of the balance of forces may be performed for any of the pistons and any of the valves disclose herein.

The ambient fluid that may enter vented fluid zone 293 exerts an upward, closing force against upper disc 960, influencing the balance of forces on piston 930. In various operational situations, the pressure of the ambient fluid is less than the pressure of the fluid in central fluid zone 290, and therefore, the closing force exerted by the ambient fluid against the upper disc 960 is less than the closing force that the fluid in central fluid zone 290 would exert against upper disc 960 if housing member 920 were absent. Thus, the presence of housing member 920 isolating upper disc 960 from the fluid in central fluid zone 290 may be beneficial in achieving a desirable balance of forces on piston 930. The benefit from housing member 920 may include achieving a net closing force for the fluid in central fluid zone 290 acting on piston 930 when valve 900 is closed.

Figure 20:
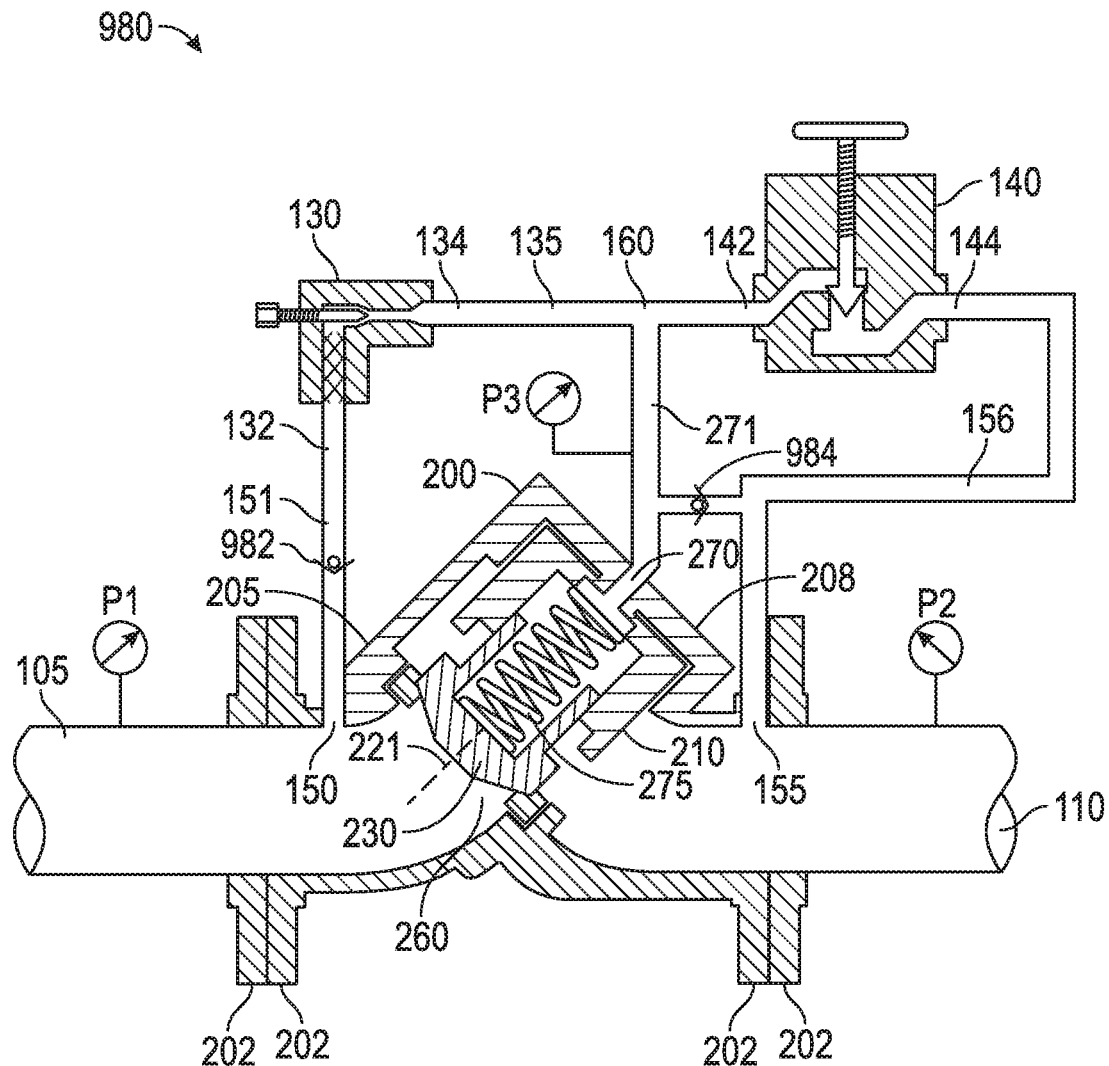
FIG. 20 is a schematic, partially cross-sectional view of a flow control system in accordance with principles described herein.

Referring now to FIG. 20, a flow control system 980 is shown for governing the flow of a fluid from a supply pipe 105 to a discharge pipe 110 by a surface area-compensated control valve 200 coupled between pipes 105, 110. The arrangement of FIG. 20 is substantially the same as FIG. 1, except two check valves 982, 984 have been added to the system of FIG. 20. The first check valve 982 is disposed in supply pressure line 151, e.g. the tubing or pipe, between fluid port 150 of supply pipe 105 and throttle valve inlet 132. Check valve 982 is oriented so as to allow fluid to flow from fluid port 150 to throttle valve inlet 132 and to prevent fluid flow in the opposite direction. The second check valve 984 is disposed in a line that couples fluid port 155 of discharge pipe 110 for fluid communication with control port 270, by-passing pilot valve 140 and manifold 160 in certain flow conditions. Thus, second check valve 984 is coupled for fluid communication between fluid line 156 and fluid line 271. Check valve 984 is oriented so as to allow fluid to flow from discharge pipe 110 to control port 270 and to prevent fluid flow in the opposite direction.

First check valve 982 prevents the backflow of fluid from discharge pipe 110, through pilot valve 140, manifold 160, and throttle valve 130 to supply pipe 105 when, for example, the discharge pressure P2 is greater than the supply pressure P1. Second check valve 984 assists or insures the closure of valve 200 during various flow conditions when the discharge pressure P2 is greater than the supply pressure P1, reducing or preventing backflow through control valve 200. Second check valve 984 is particularly advantageous for situations in which pilot valve 140 is fully closed. Second check valve 984 provides a path for the fluid pressure from discharge pipe 110 to reach control port 270 and to apply an axial, closing-force upon the control end 233 and internal cavity 235 of piston 230 (FIG. 4) when P2 is greater than P1, thereby assisting spring 275 in closing valve 200. So, the purpose of each check valve 982, 984 is to reduce or to prevent the backflow of fluid from discharge pipe 110 to supply pipe 105 along particular paths.

The control valve in FIG. 20 represents any of the various embodiments of surface area-compensated control valves described herein or that fall within the scope of this disclosure. Alternatively, another embodiment of flow control system 980 with the two check valves 982, 984 includes a conventional control valve (not shown) in place of the control valve 200. The conventional control valve does not include a surface area-compensated piston like pistons 230, 430, 530, etc. disclosed herein. The use of the two check valves 982, 984 can prevent backflow of fluid from discharge pipe 110 to supply pipe 105 even when a conventional control valve is used in system 980.

Examples of various embodiments consistent with the present disclosure have been presented. Variations are contemplated. For example, although shown as a coiled compression spring in FIG. 2, in some other embodiments, biasing member 275 for the piston may be a wave spring, a coiled extension spring, or another type of resilient member coupled to an appropriate reaction member or surface of the piston housing. In some embodiments, biasing member 275 may couple to another location on the piston, possibly without extending into a piston chamber, for example a location such as the outer surface of a first end (e.g. control end 233) or the outer surface of a second end (e.g. flow-end 237).

It is conceivable that in some control valve embodiments, the first seal 285 is disposed in a groove in a piston housing 210, 510 around the upper internal chamber 224, and the piston, such as piston 430 for example, has no upper groove 242 and has no smaller annular shoulder facing toward open end 222. These embodiments have no surfaces coupled to the piston in fluid zone 290 that facing toward open end 222. Thus in such cases, the second set of surface regions in fluid zone 290 is an empty set, having no members. Even so, the total, i.e. total, axially-projected surface area of the first set of surface regions in fluid zone 290 (as defined in various places above) exceeds the total axially-projected surface area of the second set of surface regions in fluid zone 290, which has zero area.

Although the ratio (i.e.: [a first value]/[a second value] *100%) of the total axially-projected surface area of the first set of surface regions to the total axially-projected surface area of the second set of surface regions in fluid zone 290 has been described in various examples as having a maximum value of 105% or 115%, other ratios are possible. It is to be understood that in some embodiments of control valves 200, 500, the total axially-projected surface area of the first set of surface regions is greater than 115% of the total axially-projected surface area of the second set of surface regions in fluid zone 290.

The fluid zones 290, 292, 295 have been defined with respect to specific geometric features of the various control valves. These definitions of fluid zones are made for convenience when describing the characteristics or performance of the valve. Other fluid zones may also be defined with respect to the various features of control valves 200, 500 to describe the characteristics or performance of the valve.

Although, annular seals 285, 286 were described as resilient O-rings, in other embodiments, another suitable type of seal may be used. The material of seals 285, 286 is selected to suit the intended fluid(s) and the anticipated flow conditions.

Although shoulder 450 of piston 430 is shown as a tapered surface in FIG. 9, in other embodiments, shoulder 450 extends strictly in a radial direction, similar to annular shoulder 250 of FIG. 4, or shoulder 450 is curved between seal-engaging portions 440, 445. Whether shoulder 450 is tapered, curved, or extends strictly in a radial direction, the axially-projected surface area 451 of shoulder 450 facing generally toward control end 233 is the same. The axially-projected surface area 451 of shoulder 450 influences the performance of piston 430 in control valve 200. Similarly, in various embodiments of pistons 230, 530 annular shoulders 250 is tapered or curved.

Although, piston hosing 610 of FIG. 11 is shown with no head portion coupled to sidewall 625, the removable end 208 of valve 200 acts as a head portion for piston housing 610, and in some embodiments, removable end 208 is coupled to upper end 623 of piston housing 610. In some other embodiments, piston housing 610 includes a separate head portion coupled to upper end 623, similar to head portion 215 of piston housing 210 in control valve 200 (FIG. 3) or head portion 215 of piston housing 510 in control valve 500 (FIG. 10).

Although hinges 755 are shown in FIG. 14 as being disposed outside the sidewall 625 of piston housing 710, in some embodiments, hinges 755 are disposed within recesses in sidewall 625 and do not extend radially beyond sidewall 625 when doors 750 are closed.

Reference is again given to control valve 800 in FIG. 15 in which attachment arm 856 extends radially from the top edged of each door 850. In some embodiments, an attachment arm extends from another location on the door, or the door 850 may couple to piston 830 in another suitable manner known in the art without inclusion of an attachment arm 856. For example, door 850 may couple to the outer, cylindrical surface of piston 830. Referring to piston 830, in some embodiments, intermediate portion 848 has a smaller diameter than seal-engaging portions 840, 845 in order to reduce the friction between piston 830 and piston housing 810. In some embodiments of control valve 800, piston 830 is replaced by piston 630 of FIG. 12.

Reference is again given to control valve 900 and intermediate housing member 920 in FIG. 16. Although first annular bushing 966 is located within upper chamber 927 and second annular bushing 970 is coupled to head portion 915 outside valve body 905, in some embodiments bushings 966, 970 may be repositioned for convenience or for a structural advantage. In some other embodiments, end 942 of piston rod 940 is shorter, terminating at or adjacent upper disc 960; piston rod 940 does not extend through head portion 915; and no second annular bushing 970 is included. For embodiments in which piston rod 940 does not extend through head portion 915, head portion 915 has a control port 270 disposed in an advantageous location but has no additional aperture 918. Some embodiments have no first annular bushing 966; instead a first annular seal 285 may be coupled between end plate 924 and piston rod 940. In some embodiments of control valve 900, seal 928 is coupled to piston 930 instead of valve seat 912.

For control valve 900, the first and second sets of surface regions in central fluid zone 290 were described as having one axially-projected surface area each, i.e. one member each. Even so, some embodiments may include more members in the first set or in the second set, or may include no members in the first set or in the second set. For example, in some embodiments, the entirety of piston flow end 947 is sealed from the fluid in lower chamber 928 and central fluid zone 290 when valve 900 is closed, so that no portion of piston flow end 947 remains in fluid communication with lower chamber 928, and consequently, the magnitude of area 949 is zero. Thus, the second set of surface regions in zone 290 may be described as an empty set, having no members, since no surfaces of piston 930 located in zone 290 when valve 900 is closed have an axially-projected surface area facing toward open end 922 of piston housing (i.e. valve body) 905.

In addition, the flow control system 100 disclosed in reference to FIG. 1 may also include a first check valve 982 disposed in the line between fluid port 150 of supply pipe 105 and throttle valve inlet 132 as shown and described in reference to FIG. 20 for flow control system 980. Thus, in various embodiments, a flow control system may include a check valve in no location, one location, or two locations.

Thus, while exemplary embodiments have been shown and described, modifications thereof can be made by one of ordinary skill in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims.

What is claimed is:

1. A control valve comprising:
   a piston housing comprising a hollow portion having a first end, an open end, first and second internal chambers located within the piston housing, and a fluid port configured to allow fluid to exit the second chamber, wherein the second chamber is located between the open end and the first chamber;
   a piston disposed within the housing and adapted for reciprocal motion, the piston including a first seal-engaging portion, and a second seal-engaging portion, the first seal-engaging portion having a diameter that is less than the diameter of the second seal-engaging portion;
   a first annular seal sealingly engaging the first seal-engaging portion of the piston and configured to prevent a fluid flow between at least a portion of the first chamber and at least a portion of the second chamber; and
   a second annular seal axially spaced from the first annular seal and configured to sealingly engage the second chamber and the second seal-engaging portion of the piston;
   wherein a fluid zone is disposed between the first and second annular seals and is in fluid communication with the second chamber and the fluid port;
   wherein the piston includes a first annular shoulder positioned between the first seal-engaging portion and the second seal-engaging portion and facing toward the open end of the piston housing, a second annular shoulder positioned between the first annular shoulder and the second seal-engaging portion and facing toward the first end of the piston housing, and a reduced diameter portion extending from the first annular shoulder to the second annular shoulder;
   wherein the first annular shoulder has a total axially projected surface area that is less than a total axially projected surface area of the second annular shoulder.

2. The control valve of claim 1 wherein the piston further comprises:
   a first set of surface regions facing toward the piston housing first end and having a total axially-projected surface area;
   a second set of surface regions facing toward the open end of the piston housing and having a total axially-projected surface area;
   wherein the total axially-projected surface area of the first set of surface regions exceeds the total axially-projected surface area of the second set of surface regions.

3. The control valve of claim 2 wherein the second annular seal sealingly engages the second chamber and the second seal-engaging portion of the piston when the valve is in a closed configuration;
   wherein the first and second set of surface regions are disposed in the fluid zone when the valve is in the closed configuration.

4. The control valve of claim 3 wherein the second set of surface regions includes only one surface region.

5. The control valve of claim 1 further comprising:
   a first set of surface regions facing toward the piston housing first end and having a first total axially-projected surface area;
   a second set of surface regions facing toward the open end of the piston housing and having a second total axially-projected surface area;
   wherein the first total axially-projected surface area exceeds the second total axially-projected surface area;
   wherein the piston is adapted for reciprocal motion between a closed configuration in which fluid communication is prevented between the open end of the piston housing and the second chamber, and an open configuration in which fluid communication is allowed between the open end and the second chamber;
   wherein the first and second set of surface regions are disposed in the second chamber when the valve is in the closed configuration.

6. The control valve of claim 1, wherein:
   the first chamber is disposed axially closer to the first end than to the open end; and
   the second chamber is disposed axially closer to the open end than to the first end.

7. The control valve of claim 1, wherein the first annular seal has a diameter that is less than the diameter of the second annular seal.

8. A flow control system comprising:
a flow control valve comprising:
a piston housing comprising a head portion and a hollow extension coupled thereto, the extension having an open end, first and second internal chambers located within the piston housing, and a fluid port configured to allow fluid to exit the second chamber; wherein the first chamber is adjacent to the head portion and has a diameter less than the diameter of the second chamber, and wherein the second chamber is adjacent to the open end;
a piston disposed within the housing and adapted for reciprocal motion, the piston including a first seal-engaging portion, and a second seal-engaging portion, the first seal-engaging portion having a diameter that is less than the diameter of the second seal-engaging portion;
a first annular seal sealingly engaging the first seal-engaging portion of the piston and configured to prevent a fluid flow between at least a portion of the first chamber and at least a portion of the second chamber; and
a second annular seal axially spaced from the first annular seal and configured to sealingly engage the second chamber and the second seal-engaging portion of the piston;
wherein the piston includes a first annular shoulder positioned between the first seal-engaging portion and the second seal-engaging portion and facing toward the open end of the piston housing, a second annular shoulder positioned between the first annular shoulder and the second seal-engaging portion and facing toward the head portion of the piston housing, and a reduced diameter portion extending from the first annular shoulder to the second annular shoulder;
wherein the first annular shoulder has a total axially projected surface area that is less than a total axially projected surface area of the second annular shoulder.

9. The flow control system of claim 8 wherein the control valve further comprises:
a biasing member disposed between the piston and the piston housing and configured to bias the piston in a direction away from the head portion of the housing;
wherein the first and second chambers intersect;
wherein a fluid zone extends between the first and second annular seals and is in fluid communication with the fluid port.

10. The flow control system of claim 9 wherein the second annular seal is disposed within an annular recess on an internal, cylindrical wall of the hollow extension.

11. The flow control system of claim 9 wherein the second annular seal is disposed within an annular recess on the second seal-engaging portion of the piston.

12. The flow control system of claim 9 wherein the piston further comprises:
a first set of surface regions facing toward the head portion and having a total axially-projected surface area;
a second set of surface regions facing toward the open end of the piston housing and having a total axially-projected surface area;
wherein the total axially-projected surface area of the first set of surface regions exceeds the total axially-projected surface area of the second set of surface regions.

13. The flow control system of claim 12 wherein the first and second set of surface regions include only surface regions in the fluid zone.

14. The flow control system of claim 13 wherein the total axially-projected surface area of the first set of surface regions is not greater than 105% of the total axially-projected surface area of the second set of surface regions.

15. The control valve of claim 9, wherein the first annular seal has a diameter that is less than the diameter of the second annular seal.

16. The flow control system of claim 8 wherein the control valve comprises a control port adjacent the head portion, the flow control system further comprising:
a supply pipe;
a discharge pipe;
a first system port in fluid communication with the supply pipe;
a second system port in fluid communication with the discharge pipe;
a throttle valve having an inlet in fluid communication with the first system port and having an exit in fluid communication with the control port of the control valve;
a pilot valve having a first pilot port in fluid communication with the control port of the control valve and the throttle valve exit, and having a second pilot port in fluid communication with the second system port;
wherein the control valve is disposed between the supply pipe and the discharge pipe.

17. The flow control system of claim 16 wherein at least one of the throttle valve and the pilot valve is adjustable.

* * * * *